United States Patent
Moshfeghi

(10) Patent No.: US 9,338,606 B2
(45) Date of Patent: *May 10, 2016

(54) DISTRIBUTED METHOD AND SYSTEM FOR DETERMINING THE POSITION OF A MOBILE DEVICE USING LONG-RANGE SIGNALS AND CALIBRATING THE POSITION USING SHORT-RANGE SIGNALS

(71) Applicant: Golba LLC

(72) Inventor: Mehran Moshfeghi, Rancho Palos Verdes, CA (US)

(73) Assignee: GOLBA LLC, Rancho Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/480,583

(22) Filed: Sep. 8, 2014

(65) Prior Publication Data

US 2015/0057017 A1    Feb. 26, 2015

Related U.S. Application Data

(63) Continuation of application No. 13/556,792, filed on Jul. 24, 2012, now Pat. No. 8,838,135.

(60) Provisional application No. 61/511,963, filed on Jul. 26, 2011.

(51) Int. Cl.
*H04M 1/00* (2006.01)
*H04W 4/02* (2009.01)
(Continued)

(52) U.S. Cl.
CPC ............ *H04W 4/027* (2013.01); *G01S 5/0009* (2013.01); *G01S 5/0257* (2013.01); *G01S 19/48* (2013.01);
(Continued)

(58) Field of Classification Search
CPC ............................. H04W 64/00; H04W 88/08
USPC ............... 455/456.1, 456.6, 450, 410, 456.2; 342/457, 363, 463, 378
See application file for complete search history.

(56) References Cited

U.S. PATENT DOCUMENTS

| 5,323,322 A | 6/1994 | Mueller et al. |
| 5,796,773 A | 8/1998 | Sheynblat |

(Continued)

FOREIGN PATENT DOCUMENTS

| CA | 2150757 | 5/2003 |
| JP | 2006112822 | 4/2006 |
| WO | WO 94/12892 | 6/1994 |

OTHER PUBLICATIONS

U.S. Appl. No. 14/465,795, filed Aug. 21, 2014, Moshfeghi, Mehran.
(Continued)

Primary Examiner — Kiet Doan
(74) Attorney, Agent, or Firm — Adeli LLP

(57) ABSTRACT

A method and system is described where a plurality of position reference devices use short-range wireless communication protocols to transmit positioning assistance data to nearby mobile devices, and the mobile devices use the assistance data to model errors and re-calibrate their positioning systems. The short-range communication methods include NFC, RFID, Bluetooth®, short-range 802.11, Wi-Fi Direct, and high frequency focused beams such as 60 GHz. The position reference devices are passive or active NFC tags, passive or active RFID tags, other devices that include such tags as their components, Bluetooth®-enabled devices, 60 GHz-enabled devices, and 802.11 access points that can lower their transmit power. The reference devices are located at various indoor and outdoor locations such as smart posters, kiosks, ATM machines, malls, store checkout counters, store security gates, wireless access points, cellular base-stations, tollbooths, traffic lights, and street lamp posts.

21 Claims, 13 Drawing Sheets

(51) Int. Cl.
| | |
|---|---|
| *H04W 64/00* | (2009.01) |
| *G01S 19/48* | (2010.01) |
| *G01S 5/00* | (2006.01) |
| *G01S 5/02* | (2010.01) |
| *G06Q 20/20* | (2012.01) |
| *G06Q 20/32* | (2012.01) |
| *H04W 4/00* | (2009.01) |

(52) U.S. Cl.
CPC ............ *G06Q 20/202* (2013.01); *G06Q 20/206* (2013.01); *G06Q 20/3224* (2013.01); *H04W 4/008* (2013.01); *H04W 4/02* (2013.01); *H04W 4/021* (2013.01); *H04W 64/00* (2013.01); *Y02B 60/50* (2013.01)

(56) References Cited

U.S. PATENT DOCUMENTS

| | | | |
|---|---|---|---|
| 5,841,971 | A | 11/1998 | Longginou et al. |
| 5,874,914 | A | 2/1999 | Krasner |
| 5,884,220 | A | 3/1999 | Farmer et al. |
| 5,999,124 | A | 12/1999 | Sheynblat |
| 6,061,632 | A | 5/2000 | Dreier |
| 6,131,067 | A | 10/2000 | Girerd et al. |
| 6,185,427 | B1 | 2/2001 | Krasner et al. |
| 6,204,808 | B1 | 3/2001 | Bloebaum et al. |
| 6,215,441 | B1 | 4/2001 | Moeglein et al. |
| 6,249,245 | B1 | 6/2001 | Watters et al. |
| 6,323,803 | B1 | 11/2001 | Jolley et al. |
| 6,323,806 | B1 | 11/2001 | Greving |
| 6,531,981 | B1 | 3/2003 | Fuller et al. |
| 6,611,755 | B1 | 8/2003 | Coffee et al. |
| 6,657,586 | B2 | 12/2003 | Turner |
| 6,693,592 | B2 | 2/2004 | Dowdle et al. |
| 6,700,533 | B1 | 3/2004 | Werb et al. |
| 6,853,847 | B2 | 2/2005 | Shioda et al. |
| 6,920,330 | B2 | 7/2005 | Caronni et al. |
| 7,065,369 | B2 * | 6/2006 | Tang et al. ................. 455/456.1 |
| 7,130,646 | B2 | 10/2006 | Wang |
| 7,433,694 | B2 | 10/2008 | Morgan et al. |
| 7,755,541 | B2 | 7/2010 | Wisherd et al. |
| 7,848,765 | B2 | 12/2010 | Phillips et al. |
| 8,193,978 | B2 | 6/2012 | Moshfeghi |
| 8,294,554 | B2 | 10/2012 | Shoarinejad et al. |
| 8,570,216 | B2 | 10/2013 | Gutt et al. |
| 8,831,633 | B2 | 9/2014 | Moshfeghi |
| 8,838,135 | B2 | 9/2014 | Moshfeghi |
| 8,838,477 | B2 | 9/2014 | Moshfeghi |
| 8,838,481 | B2 | 9/2014 | Moshfeghi |
| 2004/0218895 | A1 | 11/2004 | Samadani et al. |
| 2005/0030160 | A1 | 2/2005 | Goren et al. |
| 2005/0088284 | A1 | 4/2005 | Zai et al. |
| 2005/0124355 | A1 | 6/2005 | Cromer et al. |
| 2005/0190789 | A1 | 9/2005 | Salkini et al. |
| 2005/0195777 | A1 | 9/2005 | Green |
| 2005/0198228 | A1 | 9/2005 | Bajwa et al. |
| 2005/0242188 | A1 | 11/2005 | Vesuna |
| 2005/0281363 | A1 | 12/2005 | Qi et al. |
| 2006/0044161 | A1 | 3/2006 | Feldman et al. |
| 2007/0103303 | A1 | 5/2007 | Shoarinejad |
| 2007/0216540 | A1 | 9/2007 | Riley et al. |
| 2007/0252758 | A1 | 11/2007 | Loomis |
| 2007/0279281 | A1 | 12/2007 | Oda et al. |
| 2008/0055158 | A1 * | 3/2008 | Smith et al. ................... 342/464 |
| 2008/0108371 | A1 | 5/2008 | Alizadeh-Shabdiz et al. |
| 2008/0284646 | A1 | 11/2008 | Walley et al. |
| 2009/0175189 | A1 | 7/2009 | Alizadeh-Shabdiz et al. |
| 2009/0182630 | A1 | 7/2009 | Otto et al. |
| 2009/0214039 | A1 | 8/2009 | Chen et al. |
| 2011/0131104 | A1 | 6/2011 | Rose et al. |
| 2011/0164522 | A1 * | 7/2011 | Alizadeh-Shabdiz et al. ............................ 370/252 |
| 2011/0196925 | A1 | 8/2011 | Hans et al. |
| 2011/0207405 | A1 | 8/2011 | Minemura et al. |
| 2011/0251892 | A1 | 10/2011 | Laracey |
| 2012/0072350 | A1 | 3/2012 | Goldthwaite et al. |
| 2012/0089469 | A1 | 4/2012 | Bonalle et al. |
| 2012/0124346 | A1 | 5/2012 | Hardage et al. |
| 2012/0209657 | A1 | 8/2012 | Connolly |
| 2012/0246079 | A1 | 9/2012 | Wilson et al. |
| 2012/0253913 | A1 | 10/2012 | Richard |
| 2012/0280859 | A1 | 11/2012 | Moshfeghi |
| 2012/0303425 | A1 | 11/2012 | Katzin et al. |
| 2012/0323777 | A1 | 12/2012 | Liberty |
| 2012/0330763 | A1 | 12/2012 | Gangi |
| 2015/0051993 | A1 | 2/2015 | Moshfeghi |
| 2015/0057016 | A1 | 2/2015 | Moshfeghi |
| 2015/0058125 | A1 | 2/2015 | Moshfeghi |
| 2015/0234051 | A1 | 8/2015 | Moshfeghi |

OTHER PUBLICATIONS

U.S. Appl. No. 14/479,238, filed Sep. 5, 2014, Moshfeghi, Mehran.
U.S. Appl. No. 14/481,346, filed Sep. 9, 2014, Moshfeghi, Mehran.
Portions of prosecution history of U.S. Appl. No. 11/940,219, Apr. 17, 2012, Moshfeghi, Mehran.
Portions of prosecution history of U.S. Appl. No. 13/422,795, Aug. 19, 2014, Moshfeghi, Mehran.
Portions of prosecution history of U.S. Appl. No. 13/422,823, Aug. 18, 2014, Moshfeghi, Mehran.
Portions of prosecution history of U.S. Appl. No. 13/556,792, Aug. 18, 2014, Moshfeghi, Mehran.
Portions of prosecution history of U.S. Appl. No. 13/556,809, May 2, 2014, Moshfeghi, Mehran.
Portions of prosecution history of U.S. Appl. No. 13/741,369, Nov. 28, 2014, Moshfeghi, Mehran.
Author Unknown, "Cisco Application-Oriented Networking Facilitates Intelligent Radio Frequency Identification Processing at the Edge," Month Unknown, 2005, pp. 1-9, Cisco Systems.
Author Unknown, "ConnecTerra Product Family," www.connecterra.com, Month Unknown, 2005, pp. 1-2, Connecterra.
Author Unknown, "Delivering an Intelligent Foundation for RFID: Maximizing Network Efficiency With Cisco RFID Solutions," Month Unknown, 2005, pp. 1-6, Cisco Systems.
Author Unknown, "Establishing the Foundation for Enterprise-Scale RFID Deployments," www.connecterra.com/products/rftagaware.php, Sep. 2004, pp. 1-2, ConnecTerra.
Author Unknown, "Four Challenges," Month Unknown, 2004, pp. 1-7, ConnecTerra.
Author Unknown, "Installation Manual R500HA Long Range RFID Reader," www.iautomate.com, Month Unknown, 2005, pp. 1-40, iAutomate.
Author Unknown, "RFTagAware™ Enterprise Server, Centralized EPC Data Management and Reporting for Enterprise-Scale RFID Deployments", www.connecterra.com, Month Unknown, 2005,2 pages, Connecterra, Cambridge, MA.
Author Unknown, "The Sun Global RFID Network Vision: Connecting Businesses at the Edge of the Network," A Technical White Paper, Jul. 2004, 20 pages, Sun Microsystems, Santa Clara, CA.
Chun, Sebum, et al., "Performance Analysis of GPS Integer Ambiguity Resolution Using External Aiding Information," Journal of Global Positioning Systems, Month Unknown, 2005, vol. 4, No. 1-2, pp. 201-206.
Clark, Sean, et al., "Auto-ID Savant Specification 1.0", Sep. 2003, pp. 1-58, Auto-ID Center.
Dana, Peter H., "Global Positioning System Overview," Sep. 1994, 14 pages, www.colorado.edu/geography/gcraft/notes/gps/gps_f.html.
Portions of prosecution history of U.S. Appl. No. 14/465,795, Jan. 26, 2015, Moshfeghi, Mehran.
Portions of prosecution history of U.S. Appl. No. 14/479,238, Nov. 4, 2015, Moshfeghi, Mehran.
Portions of prosecution history of U.S. Appl. No. 14/481,346, Jun. 12, 2015, Moshfeghi, Mehran.
Portions of prosecution history of U.S. Appl. No. 14/698,722, Oct. 12, 2015, Moshfeghi, Mehran.

* cited by examiner

DISTRIBUTED METHOD AND SYSTEM FOR DETERMINING THE POSITION OF A MOBILE DEVICE USING LONG-RANGE SIGNALS AND CALIBRATING THE POSITION USING SHORT-RANGE SIGNALS

CLAIM OF BENEFIT TO PRIOR APPLICATIONS

The present Application is a continuation application of U.S. patent application Ser. No. 13/556,792, entitled "Distributed Method and System for Determining the Position of a Mobile Device using Long-Range Signals and Calibrating the Position using Short-Range Signals," filed Jul. 24, 2012, published as U.S. Patent Publication 2013-0029685. U.S. patent application Ser. No. 13/556,792 claims the benefit of U.S. Provisional Patent Application 61/511,963, entitled, "Distributed Method and System for Calibrating the Position of a Mobile Device," filed Jul. 26, 2011. The contents of U.S. Provisional application 61/511,963 and U.S. patent application Ser. No. 13/556,792, published as U.S. Patent Publication 2013-0029685 are hereby incorporated by reference.

BACKGROUND

Portable communication devices such as cell phones are becoming increasingly pervasive as their costs have come down and their functionalities have increased. Throughout this Specification the terms "cell phone", "cellular phone", "mobile phone", "smart phone" and "wireless phone" are used interchangeably. Such devices provide mobile users with the convenience to have voice calls from most locations using a number of standards such as code division multiple access (CDMA), Time division multiple access (TDMA), cellular second generation (2G), cellular third generation (3G), and cellular fourth generation (4G). Phone users with data plans can use their cell phone to send/receive email, check their calendar, browse the Internet, upload/download content, and store contact information and other data.

Other mobile devices such as personal digital assistant (PDA), laptop, tablet, digital/video camera, video game player, wireless headset, wireless mouse, wireless keyboard, pager, external hard drive, toy, electronic book reader, sensor, CD/DVD/cassette/MP-3 player, electronic appliance are also becoming popular. Throughout this Specification the term mobile device is used to apply to cellular phones as well as other mobile devices examples of which are given in this paragraph. Most mobile devices are now equipped with still image and video cameras and can take pictures and videos. High-end mobile devices are also computing devices that can download and run dedicated applications. Many mobile devices also support other wireless standards such as Near Field Communication (NFC), WLAN 802.11*(also called Wi-Fi), Wi-Fi Direct, Bluetooth®, Radio Frequency Identification (RFID), 60 GHz, and Ultra-wideband (UWB) standards.

Near Field Communication (NFC) is a short-range wireless technology that operates at 13.56 MHz and involves a reader (sometimes referred to as the "initiator") and a tag (sometimes referred to as the "target") that are in close proximity to each other; typically 10 cm or less. NFC typically transfers data at 106 kbps, 212 kbps, and 424 kbps. NFC tags store data in their memory that can be read by an NFC reader and displayed with an appropriate application such as a web browser, email client, etc. Tag capabilities vary depending on the size of their memory, communication speed, security, and data retention. The memory size is typically of the order of 512 bytes or less. The stored data can represent personal contacts, credit card information, personal identification numbers (PINs), rewards data, etc. The information stored in an NFC tag is usually read-only data that is provided by the manufacturer or encoded by the customer according to the NFC standard. Some tags however are rewritable.

Two NFC enabled devices have to be within a few centimeters of each other in order to communicate because NFC uses inductive coupling (also referred to as electromagnetic coupling) between the loop antennas of the NFC reader and the NFC tag. This short range reduces the possibility of malicious attacks and makes NFC ideal for electronic payment and ticketing applications. There are two main NFC communication modes; reader-writer NFC mode (also called the passive mode) and Peer-to-Peer (P2P) NFC mode (also called the active mode). In the reader-writer mode an NFC device reads an NFC tag or a device that is emulating a card. With this mode the reader provides an electromagnetic field and the tag responds by modulating and backscattering. Passive NFC tags communicate in this mode and therefore do not require batteries since they extract their power from the electromagnetic field of the reader. As a result, passive NFC tags can be low-cost tags, stickers and cards. In the P2P NFC mode two NFC devices create a connection to share some information. In this mode the reader and the tag each have their own power source and communicate in a P2P fashion, where each device generates its own field. In the P2P mode each device can also turn off its RF field (by turning off the power to its antenna circuits and coils) while the device is receiving or expecting to receive data. Active NFC tags operate in this mode and therefore require their own power, which results in more complexity and cost.

NFC offers some advantages over other short-range wireless communication standards, such as Bluetooth®. Unlike Bluetooth®, NFC does not require discovery, pairing, and menus. NFC also consumes less power than Bluetooth®, but operates at slower speeds. NFC devices just activate by close proximity. The simplicity and low-cost of NFC has potential for many applications. The NFC Forum was formed in 2004 and was charged with promoting NFC standards, applications, and devices. The NFC Forum has defined the NFC Data Exchange Format (NDEF) which is a binary format for storing and exchanging records of objects. These objects vary from Multipurpose Internet Mail Extensions (MIME) types to short documents such as uniform resource locators (URLs). For example, an NFC tag can hold a URL object that points to a server serving a document, business card, video, music, location, or map with location, etc. A shopper can place his/her NFC device near an NFC tag on a retail poster and receive coupons. A person can place his/her NFC device near an NFC tag and receive an audio or video presentation at a retail display or museum exhibit. A user can place his/her NFC device near the NFC device of another person to share a file, music, video, application, URL, business card, etc. An NFC device can touch a cashier's payment terminal and enter a pin to make a credit card type payment. NFC devices can also be used as ID cards that store personal information such as employment or medical data.

RFID is a tagging technology that uses radio waves to transfer information between RFID readers and RFID tags. The tags are typically attached to objects in order to identify and track them. RFID also operates in passive and active communication mode. RFID, however, has a greater range compared to NFC. The range of an RFID system depends on the frequency of its devices and the communication mode. In the active communication mode the tag has its own power source and the range can be from 10 centimeters up to 200 meters. In the passive communication mode the tag obtains its power from the RFID reader and the range of operation is a few meters.

The Bluetooth® standard provides short-range P2P connections between mobile devices. A Bluetooth® network is made up of small subnets or piconets. The latest standard is the Bluetooth® 4.0 standard which uses AES 128-bit encryption and claims speeds of 25 Mbps. The range of Bluetooth® is dependent on power and Bluetooth®-class and is typically of the order of 3 to 100 meters. Ultra-Wideband is another short range standard with a range of 10 to 20 meters.

Wi-Fi Direct is also a new standard from the Wi-Fi alliance that has a maximum range of over 200 meters and allows a mobile device to advertise itself as a combination of software access point and peer. Thus, a mobile device with Wi-Fi Direct can have a P2P connection to another mobile device while having a wireless LAN connection to an infrastructure network via an access point. The standard is easier to configure than previous ad-hoc methods and claims regular Wi-Fi speeds of up to 250 Mbps. It also provides security with WPA2 encryption and WPS (Wi-Fi Protection Setup) secure key handling. Wi-Fi Direct improves on the earlier WLAN 802.11 Ad-hoc by providing better interoperability and ease-of-use. IEEE 802.11z "Direct Link Setup" is also the 802.11 Working Group's take on improving ad hoc connections. The terms WLAN, 802.11 and Wi-Fi refer to the same set of wireless standards are used interchangeably in this Specification.

Another option for providing short-range communication is to use high frequencies. There are several standards bodies that are using high frequencies, such as 60 GHz. Examples of these include WirelessHD, WiGig, and Wi-Fi IEEE 802.11ad. Other short-range, high frequency standards are also supported by different mobile devices. In the U.S. the 60 GHz spectrum band can be used for unlicensed short-range data links (1.7 km) with data throughputs up to 2.5 Gbits/s. Higher frequencies such as the 60 GHz spectrum experience strong free space attenuation. The smaller wavelength of such high frequencies also enables the use of small high gain antennas with small beam widths. The combination of high attenuation and high directive antenna beams provides better frequency reuse so that the spectrum is used more efficiently for point-to-multipoint communications. For example, a larger number of directive antennas and users can be present in a given area without interfering with one another. Small beam width directive antennas also confine the electromagnetic waves to a smaller space and limit human exposure. The higher frequencies also provide more bandwidth and allow more information to be wirelessly transmitted.

Short-range Wi-Fi (or short-range 802.11) is another short-range communication method. For example a Wi-Fi access point can have two transmission powers; one for wireless connectivity and a lower power for position assistance data. The lower transmit power reduces the range so only nearby mobile devices receive data. Alternatively, the access point can use a higher frequency for transmitting the data. For example, the Wi-Fi and WiGig Alliances have agreed on a new Wi-Fi standard in the 60 GHz band for high speed (7 Gbps) short-range (about 10 meters) wireless communication. The previous two methods could also be implemented with the access point having a separate transceiver/communicator for short-range communication versus standard longer-range Wi-Fi connectivity.

Mobile devices use a number of different techniques that use wireless signals and process them into a location estimate. Typical information used for positioning includes Global Positioning System (GPS) signals, Received Signal Strength Indicator (RSSI), single trip or round-trip Time Of Arrival (TOA), Time Difference Of Arrival (TDOA), Angle Of Arrival (AOA), and Doppler shift. Triangulation is a common method where multiple range or angle measurements from known positions are used to calculate the position of a device. These techniques are complementary since some methods are more suited for indoor settings while others are more reliable in outdoor settings.

There are however a number of sources of errors in wireless positioning methods. One of the sources of errors is multipath propagation, which occurs when a signal takes different paths when propagating from a source to a destination receiver. While the signal is traveling objects get in the way and cause the signal to bounce in different directions before getting to the receiver. As a result, some of the signal are delayed and travel longer paths to the receiver. In other instances there is no direct line of sight because an object is completely blocking and any received signals occur only due to multipath propagation. Radio frequency (RF) signal amplitude is also greatly affected by metal objects, reflective surfaces, multi-path, dead-spots, noise and interference. These effects cause errors in GPS data, RSSI, AOA, TOA, TDOA and Doppler shift. For example, time delays such as TOA and TDOA represent the longer multipath distance rather than the actual distance between the transmitter and the receiver. The longer multipath propagations also result in smaller signal amplitude indicators such as RSSI, as well as incorrect values for AOA and Doppler shifts. Other sources of positioning errors are clock drift, synchronization errors, and measurement errors. These errors cause incorrect mobile position calculations for traditional location techniques.

BRIEF SUMMARY

Some embodiments provide a method of determining the position of a mobile device. The method receives positioning assistance data from a short-range position reference device. The positioning assistance data includes the position of the position reference device. The method sets the position of the mobile station to the position of the position reference device.

In some embodiments, the mobile device includes an accelerometer. The method reads the accelerometer measurement after setting the position. The method calculates an updated velocity and an updated position of the mobile device based on the accelerometer measurement, a previous velocity of the mobile device, and a previous position of the mobile device. In some embodiments, the method receives positioning assistance data from another short-range position reference device. The positioning assistance data includes a position of the other position reference device. The method sets the position of the mobile station to the position of the other position reference device. The method reads the accelerometer measurement after a predetermined time delay from setting the position of the mobile device to the position of the other position reference device and calculates an updated velocity and an updated position of the mobile device based on the accelerometer measurement, a previous velocity of the mobile device, and a previous position of the mobile device.

In some embodiments the mobile device receives positioning assistance data from the short-range position reference devices by using one or more of near field communication (NFC), radio frequency identification (RFID), Bluetooth®, short-range Wi-Fi, Wi-Fi Direct, and high frequency narrow beam including 60 GHz. The mobile device in different embodiments is a cellular phone, a personal digital assistant (PDA), a laptop, a tablet, a digital video camera, a video game player, a wireless headset, a wireless mouse, a wireless keyboard, a pager, an external hard drive, a toy, an electronic book reader, a sensor, a CD/DVD/cassette/MP-3 player, an electronic appliance, or an automobile.

The positioning assistance data includes the position reference device (ID), a type of the position reference device, an indication whether the position reference device is stationary or moving, a short-range communication protocol supported by the position reference device and its associated transmission power level, a pre-stored or calculated position, information of the position reference device, a timestamp for when a reference position associated with the position reference device was calibrated, and position assistance data for a set of positioning methods supported by the position reference device.

The mobile device in some embodiments includes a graphical user interface which enables the user of the mobile phone to choose settings to customize the positioning re-calibration such as disabling or enabling positioning re-calibration, manual or automatic re-calibration, list of approved or disapproved reference points, types of reference points to use (stationary, moving, NFC type, etc.), times/dates and places for re-calibration, and weights for combining different positioning methods to get a final combined position.

Some embodiments provide a method of determining a location of a mobile device. The method receives positioning assistance data from several short-range position reference devices. The positioning assistance data from each position reference device includes the location of the corresponding position reference device. The method calculates a weighted sum of the locations of the position reference devices. The locations are weighted based on a set of criteria. The method sets the location of the mobile station to the calculated weighted sum of the locations of the position reference devices. The set of criteria is used to weight the location of each position reference device based on the short-range communication protocol or how far they are from the mobile device (higher weights are given to shorter-range protocols and closer reference points). If the reference devices are moving the weights in some embodiments also take into account how recently the reference devices were calibrated. In some embodiments, higher weights are given to more recently calibrated moving reference points.

Some embodiments provide a method of determining location of a mobile device that has several different radio types. Each radio uses a different communication protocol. The method receives a group of signals through each radio and determines the location of the mobile device from the group of signals that are received through each radio by using a positioning method corresponding to each radio. The method sets the location of the mobile device to a computed weighted sum of the determined locations. The method then receives positioning assistance data from a short-range position reference device. The positioning assistance data include the location of the position reference device. The method calibrates each positioning method such that the location determined by the method is a same as the location received from the position reference device. In some embodiments, the method receives a group of signals through each radio after a predetermined time delay from calibrating each positioning method. The method determines the location of the mobile device from the group of signals received through each radio after the time delay using the positioning method corresponding to each radio. The method sets the position of the mobile device to a computed weighted sum of the determined locations. In some embodiments, setting the location of the mobile device to the computed weighted sum of the determined positions includes weighting each determined location based on a confidence measure for the corresponding positioning method.

In some embodiments, longer-distance reference points are ignored. In some of these embodiments the mobile device is proactive and explicitly ignores distant reference points. For instance, if the power level received from an access point has dropped by a certain amount then the range is too far and its reference position is ignored by the mobile. Alternatively, the access point is proactive and adjusts its reference position transmission so that they are limited to a short range (e.g., 1 to 2 meters). Some embodiments utilize a weighting scheme as a more general formulation where small weights are given to distant access points. Ignoring the distant references is a special case where a weight of 0 is given to distant reference points and a weight of 1 is given to the nearby access points. Some embodiments use short-range communication with a nearby position reference point to find out an accurate position and use that to calibrate a longer-range positioning methods such as GPS, WLAN, cellular, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

A method and system is described where one or more position reference devices use short-range wireless communication protocols to transmit positioning assistance data to nearby mobile devices, and the mobile devices use the assistance data to model errors and re-calibrate their positioning systems. The short-range communication methods include NFC, RFID, Bluetooth®, Wi-Fi, Wi-Fi Direct, short-range 802.11, and high frequency focused beams such as 60 GHz. The high frequency standards include WirelessHD, WiGig, and Wi-Fi IEEE 802.11ad. Some embodiments of the invention support other short-range high frequency standards.

The position reference devices are either passive or active NFC tags, passive or active RFID tags, other devices that include such tags as their components, Bluetooth®-enabled devices, 60 GHz-enabled devices, and 802.11 access points that are able to lower their transmit power. The reference devices in some embodiments are located at various indoor and outdoor locations such as smart posters, kiosks, ATM machines, malls, store checkout counters, store security gates, wireless access points, cellular base-stations, tollbooths, traffic lights, and street lamp posts. While most position reference devices are fixed in location, others are moving but are such that they have accurate positioning. The position reference devices are typically small and low cost. The mobile devices whose position are to be determined are consumer devices such as a cell phone, PDA, laptop, tablet, digital/video camera, video game player, wireless headset, wireless mouse, wireless keyboard, pager, external hard drive, toy, electronic book reader, sensor, CD/DVD/cassette/MP-3 player, electronic appliance, or an automobile.

Figure 1:
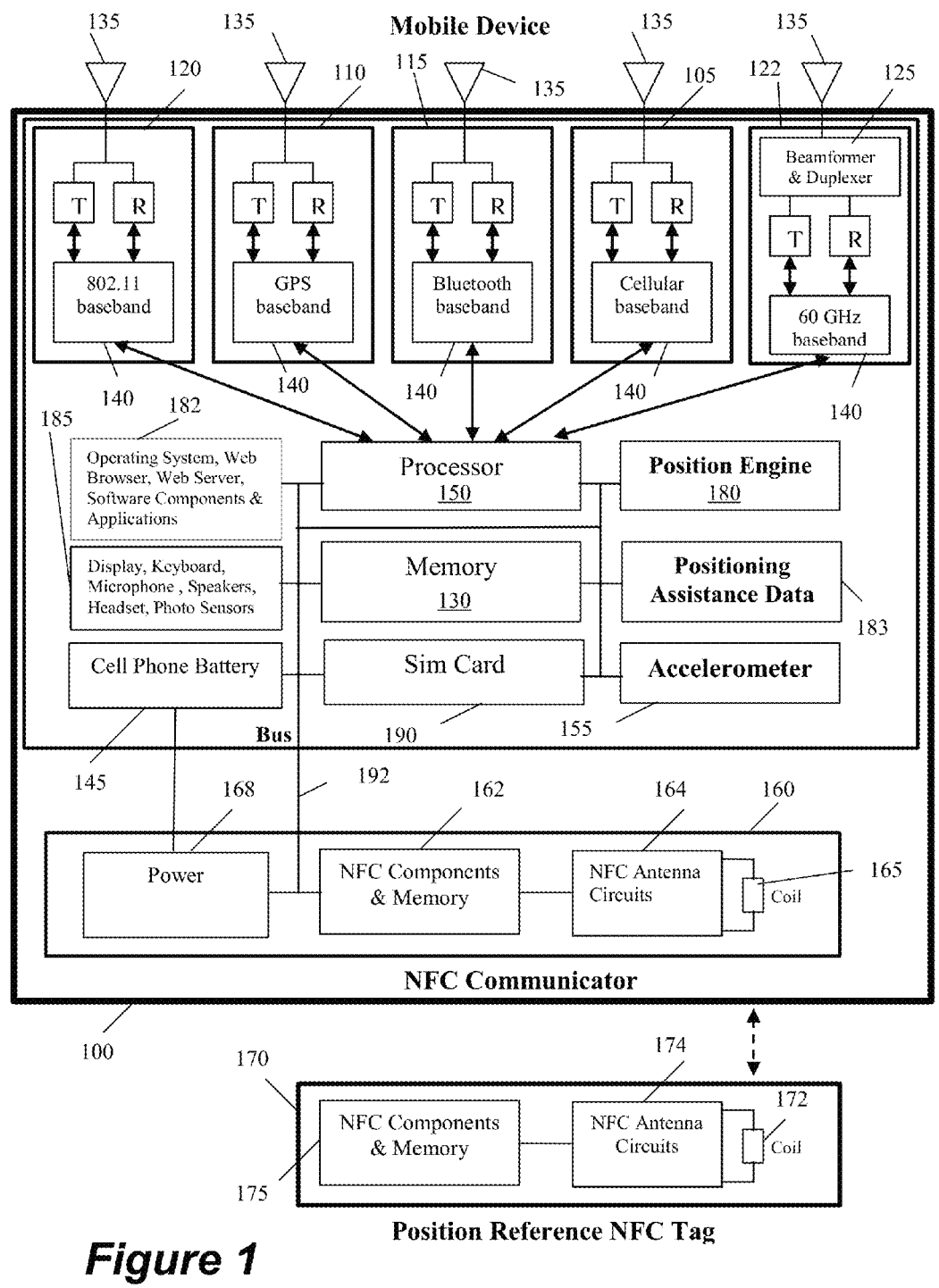
FIG. 1 conceptually illustrates a block diagram of a mobile phone with short-range and long-range communication radios in some embodiments of the invention.

FIG. 1 conceptually illustrates a block diagram of a mobile phone 100 with short-range and long-range communication radios in some embodiments of the invention. Although the examples and illustrations describe a mobile phone the invention is applicable to a variety of consumer electronics devices, some of which were listed above. In FIG. 1 some of the blocks and radios are optional and are found in more advanced smart phones. The figure shows several wireless radio modules with antenna 135 that transmit and receive electromagnetic waves, and baseband transceivers 140 that process the information. Thus, in addition to the cellular radio 105, the mobile phone has different range radios such as GPS 110, Bluetooth® 115, 802.11 (Wi-Fi) 120, 60 GHz 122 with beam-forming 125, RFID (not shown in the figure), etc. These radios share the same antenna or use separate antennas in different embodiments. Mobile devices that are cellular phones include the cellular radio 105, while other mobile devices may not include cellular radio but include one or more short-range radios and/or NFC.

As shown, a processor 150 controls the radios and uses their data together with a position engine 180 to calculate the location of the mobile phone 100. The mobile phone also has an accelerometer 155 for accelerometer-based positioning. The mobile phone has an NFC communicator 160 that obtains its power 168 from the phone battery 145 and includes NFC components 162 and memory 162, NFC antenna circuits 164 and one or more coils 165. The NFC communicator 160 is used to read NFC tags, barcodes, smart cards, and interface with electronic payment systems in some embodiments.

The NFC communicator 160 is also used to obtain positioning assistance data from nearby NFC reference devices. Positioning assistance data storage 183 stores positioning assistance data received from nearby references devices. The assistance data is processed by the position engine 180 to obtain positioning error models and correction data, which are used to obtain more accurate positions for the mobile phone. The memory 130 has read-only-memory (ROM) for program storage and random access memory (RAM) for running programs. The operating system 182 (shown with several other software components and applications) interfaces the hardware with the user and manages resources.

Input devices 185 of the mobile phone include keyboard and/or touch screen, microphone, and a camera photo-sensor for still pictures and video. Output devices 185 of the mobile phone include a display, speaker, and wired or wireless headsets. The mobile phone has a subscriber identity (or identification) module (SIM) card 190 and a number of dedicated software components and applications such as email, instant messenger, chat, SMS, social networking, and camera. The mobile phone also has a web server 182 and browser 182 that can browse information on the intranet/Internet and download other applications and data from the network. There is a bus 192 that links all these components with the processor 150 and 130 memory.

In FIG. 1 the mobile device is in close proximity to a passive NFC tag 170. The tag has one or more coils 172, NFC antenna circuits 174, and NFC components and memory 175. The mobile device's NFC communicator provides an electromagnetic field. The tag extracts its power from the electromagnetic field and responds by modulating it and backscattering. In some embodiments the NFC tag encrypts its data. The encryption in some embodiments is a simple table lookup that is stored in the tag's memory. Alternatively, the tag in some embodiments points to a server for encryption purposes. FIG. 1 shows an example of a reader-writer NFC mode of communication. Examples of P2P NFC mode of communication are where the mobile device communicates with an active tag or with the NFC communicator of another nearby mobile device.

I. Short-Range Wireless Position Assistance

Figure 2:
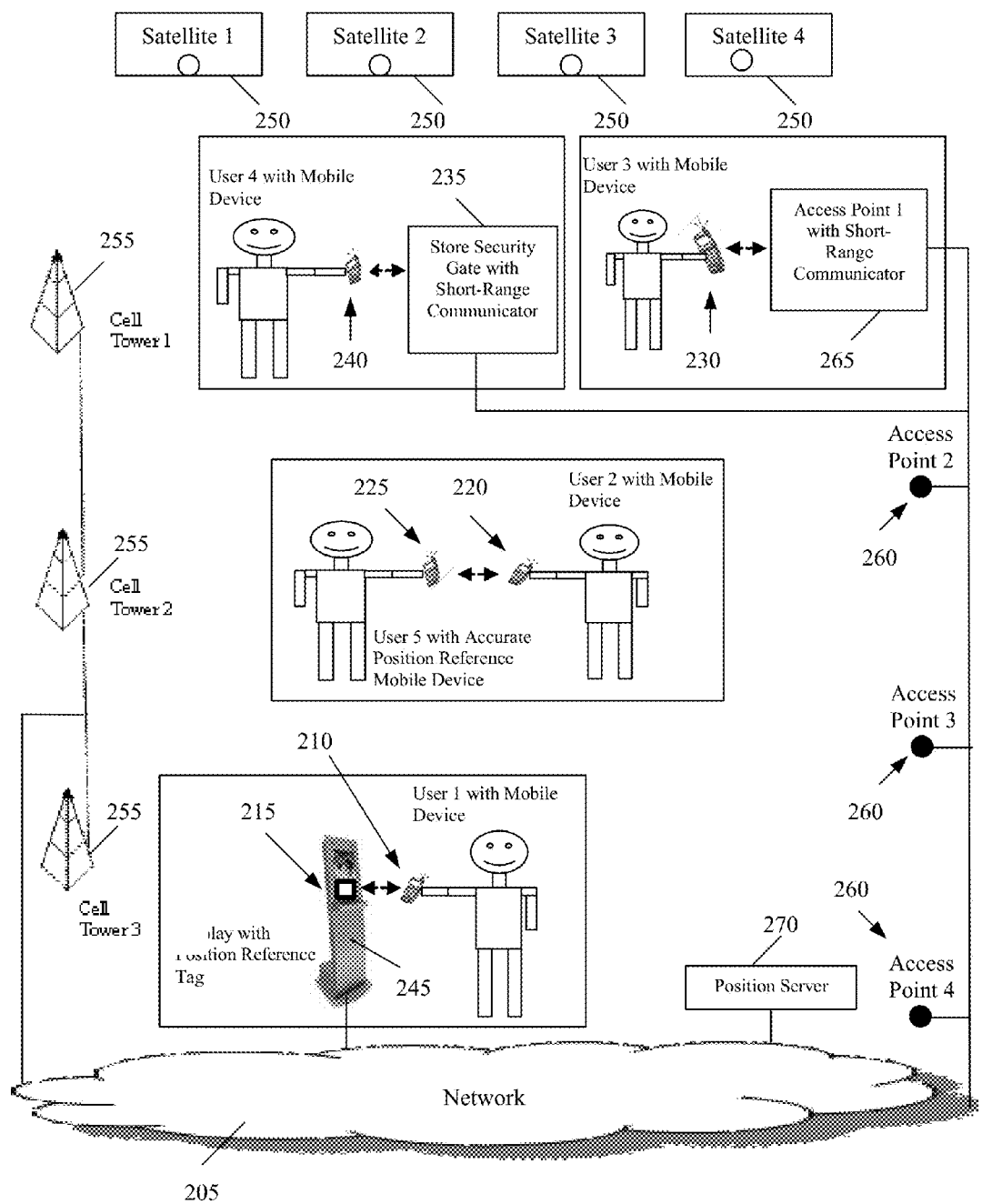
FIG. 2 conceptually illustrates several scenarios of using short-range wireless communication to transmit position assistance data from a reference device to a mobile device in a geographic area that has multiple wireless networks in some embodiments of the invention.

FIG. 2 conceptually illustrates several scenarios of using short-range wireless communication to transmit position assistance data from a reference device to a mobile device in a geographic area that has multiple wireless networks in some embodiments of the invention. The networks 205 include GPS, cellular, WLAN 802.11, Bluetooth®, Worldwide Interoperability for Microwave Access (WiMax), UWB, HD Radio™, 60 GHz, and NFC. Each type of network can also have different implementations. For instance, the WLAN 802.11 standard can include 802.11b, 802.11a, 802.11g, and 802.11n. The cellular network can include Code Division Multiple Access (CDMA), CDMA2000, Wideband CDMA (WCDMA), Time Division Multiple Access (TDMA), Frequency Division Multiple Access (FDMA), and other multiple access techniques.

The networked position server 270 performs a range of functions such as monitoring, storing, computing, and transmitting position-related information. For example, the position server in some embodiments stores/computes/transmits information such as the position of a subset of the access points, the position of some of the reference points, and position assistance data. In some embodiments the position server receives data from the access points, from the reference points, and/or from the mobile devices and computes the position of a mobile device and transmits the computed position back to the mobile. The position server monitors the position of some of the moving devices and updates its storage data and transmits the updated information in some embodiments. In other embodiments, the position server stores and transmits mapping information such as outdoor maps, indoor maps of malls, and indoor isle and layout maps of stores. In yet other embodiments, the position server coordinates a number of access points for locating a mobile device. For instance, the position server synchronizes the access points and their timing.

There are users in this area that are carrying mobile devices, such as those of FIG. 1, that have one or more wireless transceivers and use such networks for communication and positioning. The communication can be downlink from the network base-stations (satellites 250, access points 260-265 (e.g., WLAN access points), cellular towers/base-stations 255, etc.) to the mobile device, or the uplink direction from the mobile device to the base-stations. All positioning methods have some errors that are caused by factors such as obstacles, reflections, time delay, and phase measurement errors. Thus, it is important to provide accurate position reference points for position assistance data and error correction.

FIG. 2 illustrates some scenarios of using short-range wireless communication to transmit position assistance data from a position reference to a mobile device. Although the examples in the figure are shown as mobile phones, other mobile devices are also used in some embodiments. FIG. 2 user 1 brings his mobile phone 210 near a passive NFC tag 215 that is embedded in a stand 245 such as a kiosk, ATM machine, or smart poster.

The position of the NFC tag 215 has previously been measured accurately using commercial grade GPS or surveying techniques. This position is then written to the memory of the tag. The NFC tag 215 could also be active if it has its own power source or uses the power source of the stand. For the passive tag case, however, the mobile phone 210 uses induction to power up the tag and the tag responds and transmits information to the NFC communicator of the phone. The transmitted information includes the accurate position coordinates of the tag. The NFC communicator transfers this information to the processor of the mobile phone. The phone's processor and position engine then use that information to re-calibrate the positioning methods of the phone as described further below.

In FIG. 2, user 2 comes in close proximity to user 5 who is carrying another mobile phone with an accurate positioning method. User 2 brings his mobile phone 220 near user 5's mobile phone 225 and receives the position of that phone and other position assistance data with a short-range protocol such as P2P NFC, Bluetooth®, Wi-Fi Direct, 60 GHz, etc. User 2's mobile phone 220 then uses that information for position re-calibration. This is an example of a moving position reference point, where even though the position of user 5's phone is changing it might have positioning hardware and software. For example, user 2's phone may only have GPS positioning and its GPS receiver may not be sensitive enough to receive GPS signals at that location, whereas user 5's phone has a more sensitive GPS radio or it has non-GPS positioning methods that user 2's phone does not have.

Alternatively, user 5's mobile phone 225 might have been recently re-calibrated using another fixed location or moving reference point. In some embodiments, a position reference device such as user 5's phone also transmits the date and timestamp when its positioning method(s) was/were calibrated. This is important when the reference point is moving because some positioning errors compound over time. User 2's phone may then choose to ignore the reference position and assistance data if the calibration date/time is not recent.

In FIG. 2 user 3 with his mobile phone 230 comes near access point 1 (AP1) 265 that is a position reference and has a short-range wireless communicator. This communicator can be based on NFC, RFID, Bluetooth®, short-range Wi-Fi, Wi-Fi Direct, or high frequency narrow beam methods such as 60 GHz. AP1's position has been previously measured using accurate commercial methods and stored in AP1. The access point in some embodiments vary the transmit power of its communicator in order to adjust its range. For instance, if its communicator is using NFC then it can increase the transmit power so users do not have to come very close to it to receive position reference data. Likewise, if its communicator is using 802.11 it can lower the transmit power of the assistance data transmission so that only mobile devices that are in close proximity of the access point receive the assistance data.

The criteria for adjusting the transmit power of an access point's communicator is detection that a user is within a pre-specified acceptable distance (e.g., 1 meter or less) from the access point, for the access point to transfer its reference position information and position assistance data. For instance, when mobile device 230 is within 1 meter of access point 265 and requests reference position information, the access point receives the request. The mobile device in some embodiments also includes its transmission power level in the request. The access point looks at the power level of the mobile device's request signal that it receives and compares it to the transmission power level to determine that the mobile is within 1 meters of the access point, and adjusts its transmission power so mobile device 230 receives and accepts the reference position information. For example, the access point increases the transmission power of its NFC communicator to increase its range to 1 meter and uses the NFC communicator to transfer the reference position information.

Alternatively, access point 265 uses its 802.11 communicator and adjusts the transmission power to its 802.11 communicator such that the mobile device 230 receives a strong enough signal but mobiles that are further away than 1 meter (such as mobile devices 240, 225, 220, and 210), receive signal powers that are below acceptable levels. Access point 265 only lowers the 802.11 transmission range for its position reference data, and its other information transfer such as Internet access occur at normal higher power levels and larger distance coverage. In some embodiments the mobile device is proactive and performs calculations to determine if the mobile device is close enough to an access point to accept its reference position information. For example, mobile device 230 requests and receives reference position information from the 802.11 communicator of access point 265. The access point also transfers its transmission power level to the mobile device. The mobile device then compares the power of the received signal with the power level of the transmission from the access point and accepts the reference position information only if the mobile device determines that it is close enough in distance to the access point (for example, the received power at the mobile is −20 dBm from the access point's maximum transmission power, and at the 802.11 transmitted frequency the −20 dBm power drop correspond to a travel distance of 1 meter or less).

In FIG. 2 user 4 also passes through a store's security gate 235, which is a position reference and has a short-range communicator. The store's security gate uses its communicator to transmit amongst other things its position and position assistance data to the mobile phone 240 of user 4.

Figure 3:
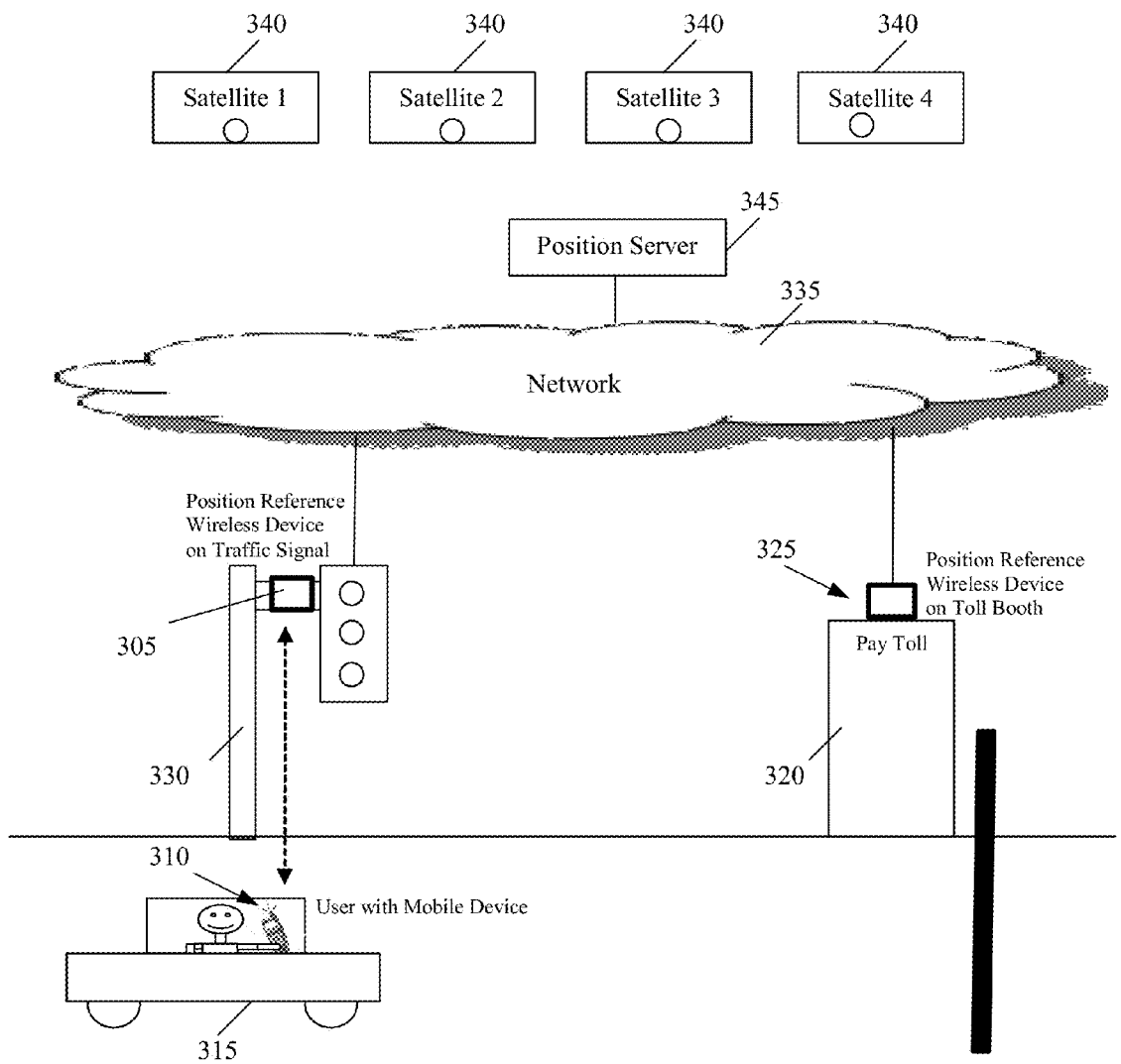
FIG. 3 conceptually illustrates a vehicle navigation application in some embodiments of the invention where a user with a mobile device is inside a moving vehicle and position reference devices are distributed near the road on traffic signals, tollbooths, lamp posts, etc.

FIG. 3 conceptually illustrates a vehicle navigation application in some embodiments of the invention, where a user with a mobile device is inside a moving vehicle and position reference devices are distributed near the road on traffic signals, tollbooths, lamp posts, etc. In some embodiments, the vehicle navigation system includes GPS using orbiting satellites 340. In some embodiments, the vehicle navigation system includes (in addition to the GPS or in lieu of the GPS), other wireless positioning methods of a mobile device such as a phone or a laptop or a tablet that is inside the car. The other wireless positioning methods include different short-range positioning methods (e.g., Wi-Fi) described throughout this Specification. The figure shows higher power position references with higher range for vehicle applications. The reference devices are connected to a network 335 and communicate with a networked position server 345. The position server stores data, performs position calculations, coordinates and synchronizes the clocks of reference points and access points (not shown), and downloads or uploads information.

In FIG. 3, the position reference devices are low-cost off-the-shelf devices that utilize widely used short-range protocols (e.g., NFC, Bluetooth®, RFID, 802.11, etc.) that are in many consumer electronic devices. Therefore, the position reference devices not only calibrate the GPS positioning of the car's built-in navigation system, but also the GPS positioning as well as Wi-Fi or other wireless positioning methods of other mobile devices such as phone, laptop, tablet, etc., that is inside the car. Also, the positioning method in some embodiments is an absolute correction method because absolute position is provided. This is in contrast to differential correction methods such as differential GPS (DGPS).

The wireless communication methods used by the position reference devices include NFC, RFID, Bluetooth®, short-range Wi-Fi, Wi-Fi Direct, and high frequency narrow beam methods such as 60 GHz. However, the reference devices adjust their power and frequency in order to increase their range for longer range scenarios such as vehicle applications. The range of any type of radio modules can be increased or decreased by changing the transmit power. The accuracy of the reference position data is a function of the range, and the range is a function of the protocol and the transmit power used for that protocol. For example, a reference device can use an external high power source, such as an AC power outlet, for its NFC communicator so higher power can be provided to the NFC antenna circuits 174 and coil 172 (shown in FIG. 1), thereby extending the range of the reference device's NFC to a few meters. The external power supply can also be used to extend the transmission power and range of other wireless communicators of the reference device (RFID, Bluetooth®, short-range Wi-Fi, Wi-Fi Direct, and 60 GHz). In some alternative embodiments wireless signal boosters are installed near a position reference device to increase the ranges of the wireless communicators of the position reference device. Thus, when the user is near the traffic signal 330 reference position and assistance data are transmitted from the traffic signal's NFC communicator 305 to the NFC communicator of the user's mobile device 310.

The user's mobile device 310 uses the information to re-calibrate its position and positioning methods at that point. As the car 315 moves away the user's mobile device 310 uses its own re-calibrated positioning methods to calculate its position and give direction guidance if needed. The car then stops at a tollbooth 320. The NFC device 325 of the tollbooth transmits its reference position and assistance data to the mobile device of the user. The mobile device uses the information to re-calibrate its position and positioning methods again. The car then moves away and the user's mobile device uses its re-calibrated positioning methods. This process is repeated as the mobile device of the user receives other reference position and assistance data. The mobile device in some embodiments is a fixed component of the car such as its navigation system.

The reference device can transmit its position in different formats, such as GPS coordinates or a URL object. The URL in some embodiments points to a map server with the reference position. Thus, in FIG. 2 and FIG. 3 the mobile devices of the users who receive a reference position are able to use a browser to display the current reference position, as shown in FIG. 4.

Figure 4:
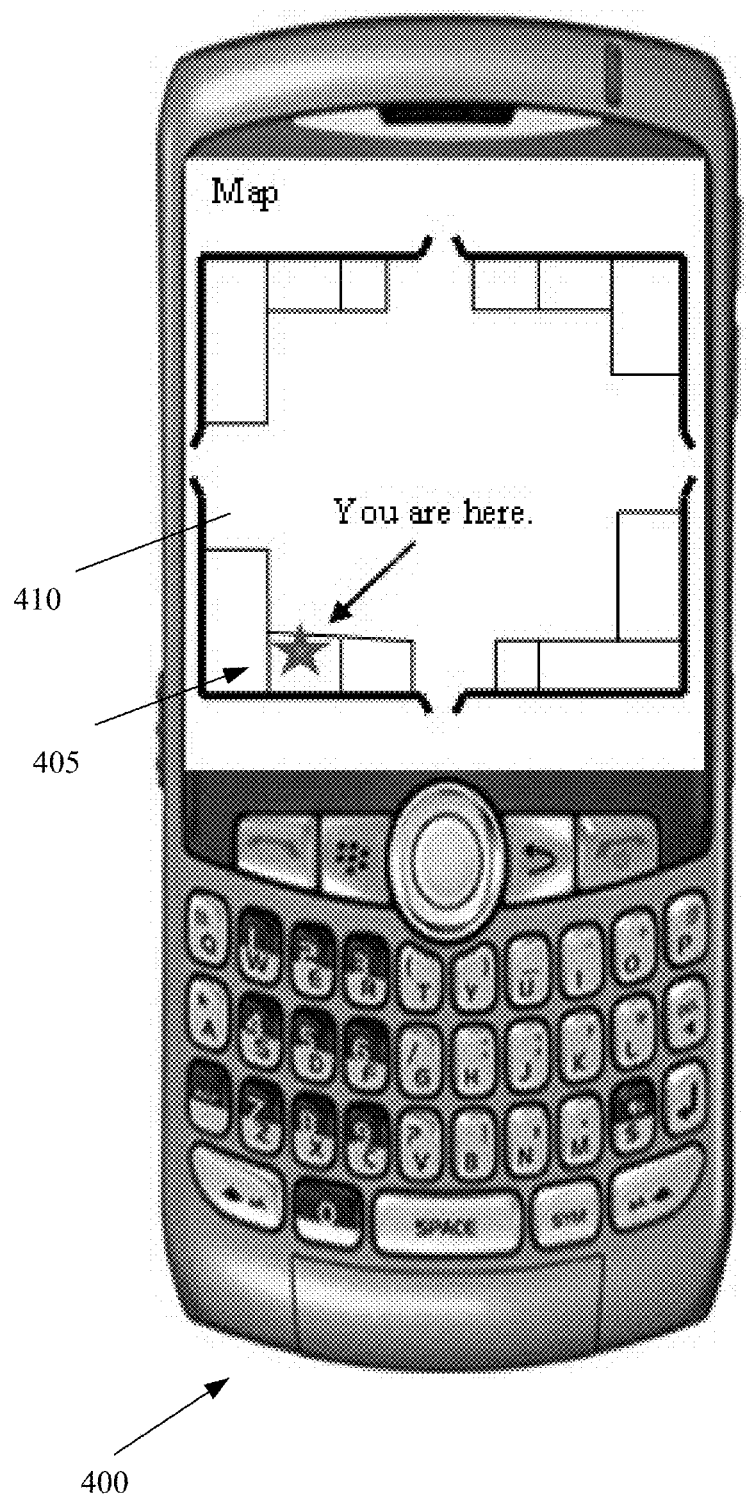
FIG. 4 illustrates a mobile device that uses a position reference to display its accurate location on a map in some embodiments of the invention.

FIG. 4 illustrates a mobile device that uses a position reference to display its accurate location on a map in some embodiments of the invention. As shown, the mobile device 400 displays a map 410 and identifies the current location of the mobile device 405 on the map. The mobile device then re-calibrates its positioning methods until a new position reference is found for re-calibration. The display is part of a graphical user interface of the mobile device. As described herein, several processes and programs in different embodiments receive setups and commands through the graphical user interface (e.g., from keyboard, touchscreen, audio input, pointing devices, etc.) and provide position information (e.g., on the display, through voice output, by electronic messaging, etc.)

II. Accelerometer Positioning Re-Calibration Using Short-Range Wireless Position Assistance Accelerometers are electromechanical devices that measure inertia and acceleration forces. Acceleration forces are either static like gravity, or are dynamic forces that are caused by movement and/or vibration. It is possible to find a device's tilt angle with respect to the earth by measuring the amount of static acceleration due to gravity. It is also possible to calculate the way a device is moving by sensing dynamic acceleration.

An accelerometer is used in some embodiments to calculate future position information if it is given an initial starting position. The starting position in some embodiments is obtained by a nearby reference device. Acceleration is the rate of change of velocity with time and velocity is the rate of change of position with time. Thus, acceleration is the derivative of velocity with respect to time and velocity is the derivative of position with respect to time. If the acceleration of a mobile device is known, in the absence of errors, its position is determined by a double integral with respect to time, where the first integration provides the velocity and the second integration provides the position. In practice errors accumulate over time, which need correction. Accelerometer positioning are therefore used in some embodiments over short time intervals and for longer time intervals requires the frequent use of nearby position references to reset the accumulated errors to zero.

One technique that is used in some embodiments to reduce random noise for accelerometer positioning is Kalman filtering. Kalman filtering is a well-known technique that uses time dependent probability theory. It is a statistical method that combines knowledge of the statistical nature of system errors with knowledge about the dynamics of the system to provide an estimate of the state of the system. In a positioning application the state of the system can be represented by position and velocity. Kalman filtering uses a Kalman gain weighting function to reduce the error covariance for update estimates. One of the sources of errors is accelerometer bias. A Kalman filter estimates the bias and removes it from any measured acceleration.

Figure 5:
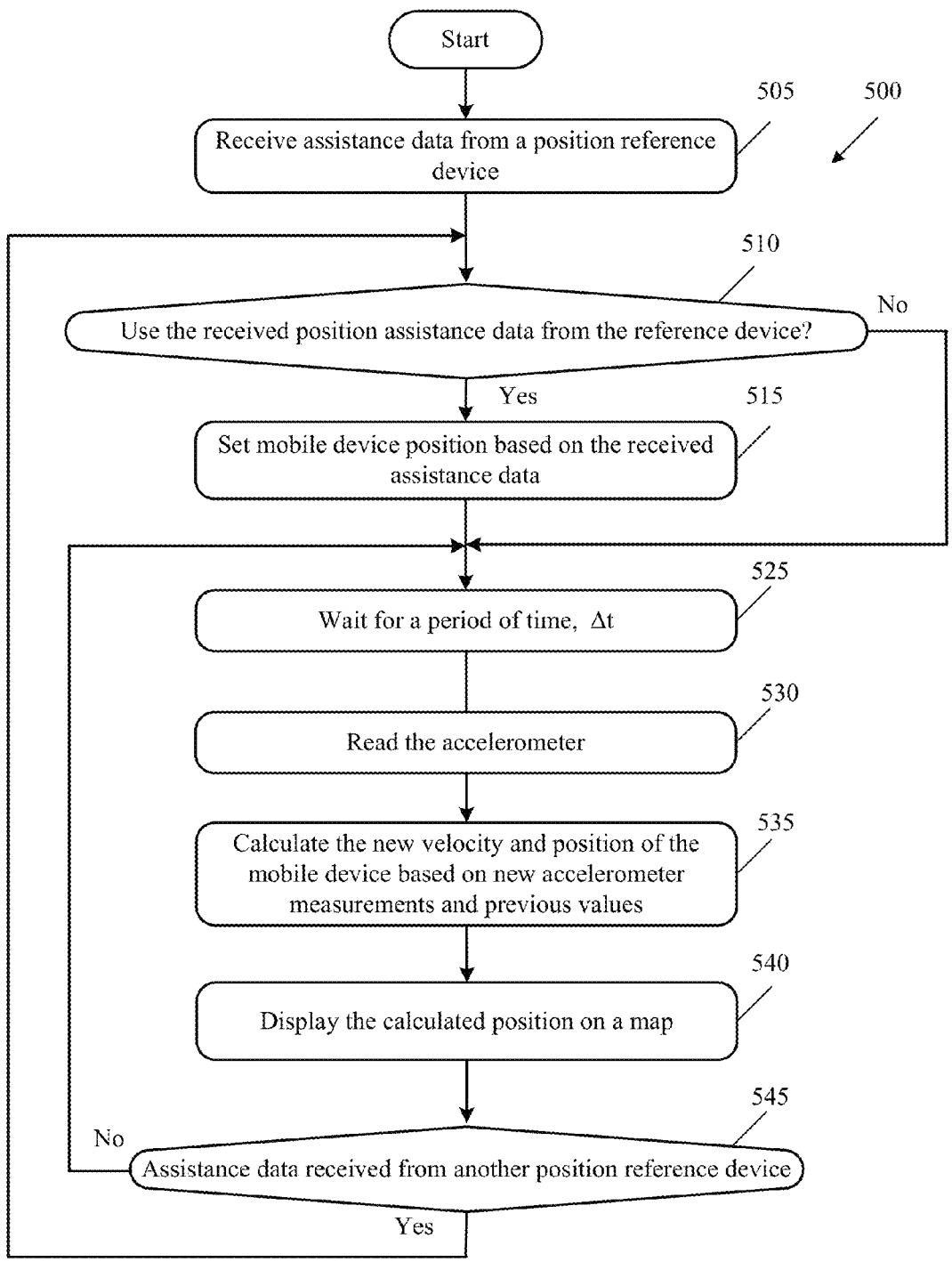
FIG. 5 conceptually illustrates a process that calculates the position of a mobile device by using the mobile device accelerometer and data from nearby position reference devices in some embodiments of the invention.

FIG. 5 conceptually illustrates a process 500 that calculates the position of a mobile device by using the mobile device accelerometer and data from nearby position reference devices in some embodiments of the invention. The wireless communication methods used by the position reference devices include short-range protocols such as NFC, RFID, Bluetooth®, short-range Wi-Fi, Wi-Fi Direct, high frequency narrow beam methods such as 60 GHz, etc. The position calculations are performed, e.g., by the mobile device position engine 180 and processor 150. To simplify the discussions, it is assumed that the accelerometer is previously calibrated such that when the mobile device is not moving the output reading of its accelerometer represents zero acceleration. Higher readings represent acceleration and lower readings represent deceleration. This calibration is performed at the manufacturer site in some embodiments. In other embodiments, the accelerometer calibration is performed by the user when the mobile device is stationary and near a position reference device.

When the mobile device comes in close proximity to a position reference device, process 500 receives (at 505) position assistance information from the position reference device through a short-range wireless protocol. The position assistance information transmitted by the reference device in some embodiments includes one or more of the reference device identification (ID), general information such as its type and whether it is stationary or moving, its short-range communication protocol and associated transmission power level, its pre-stored or calculated position information, the timestamp for when its own reference position was calibrated, and position assistance data for different methods such as GPS, Wi-Fi, etc.

The process then checks the received information and determines (at 510) whether to use the received information for position re-calibration. This decision in some embodiments is based on the settings of the mobile device, which the user changes with a graphical user interface. For instance, the user is given the option to disable or enable positioning re-calibration. In some embodiments, the user has the option to specify that he/she only wants re-calibration to be performed at certain times of the day, or on certain days of the week, month, year, etc. The user also has the option to specify that he/she wants position re-calibration to be performed at certain places, such as towns, malls, etc. The user has the option to make the re-calibration automatic, or to make it manual where the user has to approve a certain position reference point. The user in some embodiments stores a list of IDs of reference points that he/she approves for automatic re-calibration. The user can also include a list of IDs of reference points that he/she does not approve. The settings in some embodiments also allow the mobile device user to choose certain categories of reference points and ignore other categories. For example, the user has the option to specify that he/she only wants to use stationary reference points and ignore moving ones, or use mobile reference points that have been calibrated within a period of time in the past (e.g., in the last hour).

In another example, the user specifies that he/she only wants to use NFC position reference devices because of their shorter range and greater accuracy. The settings in some embodiments allow the user to specify weights for each positioning method to obtain the final combined position as described by reference to FIG. 9, below (e.g., highest weights to GPS positioning and TOA, lowest weight or zero weights to cellular positioning).

When the process decides not to use the assistance data from the reference device, the process proceeds to 525 to continue with the existing positioning, which in the case of accelerometer positioning means the process calculates the mobile device's new velocity and position based on previous values as described below. Otherwise, when the process decides to use the assistance data from the reference device, the process resets (at 515) the mobile device position to the pre-stored or calculated position of the reference device. This step resets to zero the errors that have accumulated over time, and allows the accelerometer positioning method to re-calibrate and resume operation from another initial accurate position. The more frequently the mobile device encounters reference devices and uses them to rest the cumulative errors, the more accurate the positioning algorithm becomes. The process, therefore, resets the errors that have accumulated over time to zero every time the mobile device uses a nearby position reference. The accelerometer positioning algorithm then starts from an accurate initial position again.

The process then waits (at 525) a time interval Δt and then checks (at 530) the accelerometer reading. The process then uses this value and an algorithm such as Kalman filtering to compute (at 535) the new velocity and position. The process then optionally displays (at 540) the new position on a map on the mobile device display. The process then determines (at 545) whether assistance data is received from another position reference device. If not, the process proceeds to 525 and the operations of updating velocity/position and map display are repeated at regular Δt time intervals until the mobile device comes near another position reference, at which point the process receives new position assistance information and proceeds to 510 to repeat the re-calibration operations again.

III. Recalibration of Long-Range Positioning Using Short-Range Wireless Assistance Mobile devices use a number of different techniques that use wireless signals and process them into a location estimate. Typical information used for positioning includes long-range signals such as Global Positioning System (GPS) signals, cellular signals, high transmission power or boosted Wi-Fi signals, HD Radio™ signals, Worldwide Interoperability for Microwave Access (WiMAX) signals, etc. The range of these signals is more than 50 meters and up to 50 kilometers.

The positioning methods include single trip or round-trip Time Of Arrival (TOA), Time Difference Of Arrival (TDOA), Received Signal Strength Indicator (RSSI), Angle Of Arrival (AOA), and Doppler shift. Triangulation is a common method where multiple range or angle measurements from known positions are used to calculate the position of a device. For GPS signals, positioning is done by timing radio signals sent from each of several satellites with known locations to the receiver.

There are however a number of sources of errors in wireless positioning methods. The sources of error include multipath propagation and lack of direct line of sight between the transmitter and receiver. The amplitude of RF signals is affected by metal objects, reflective surfaces, multipath, dead-spots, noise and interference. These effects cause errors in GPS data, RSSI, AOA, TOA, TDOA and Doppler shift. For example, time delays such as TOA and TDOA represent the longer multipath distance rather than the actual distance between the transmitter and the receiver. The longer multipath propagations also result in smaller signal amplitude indicators such as RSSI, as well as incorrect values for AOA and Doppler shifts. Other sources of positioning errors are clock drift, synchronization errors, and measurement errors. These errors cause incorrect mobile position calculations for traditional location techniques.

As described in the following sections, some embodiments utilize a novel approach for using short-range wireless communication (e.g., with a range of less than 10 meters, less than 2 meters, less than 1 meter, etc.) between low-cost position reference points and mobile devices to provide position assistance data for mobile devices that use long-range wireless signals (e.g., with a range of 45 meters to several kilometers) to do positioning. The short-range wireless communication methods include NFC, RFID, Bluetooth®, short-range Wi-Fi, Wi-Fi Direct, UWB, and high frequency narrow beam methods such as 60 GHz.

A. WLAN/Cellular Positioning Re-Calibration with Short-Range Wireless Position Assistance Some embodiments determine the location of a mobile device by measuring the Time of Arrival (TOA) of a signal. The TOA can be from an access point to the mobile device, from the mobile device to an access point, or it can be the round-trip time from the mobile device to the access point and back to the mobile device. If the signal transmission time and reception time are measured with the same clock then the time difference can be calculated. This time difference represents the propagation time. The propagation time is multiplied by the speed of light to calculate the distance between the transmitter and the receiver. The process of determining the propagation time between an access point and the mobile device is repeated in some embodiments with three (or more) base-stations with known position coordinates and synchronized time clocks. The location of the mobile device is then determined as the intersection of three (or more) spheres, where the center of each sphere is the location of the respective access point and the radius is the respective distance between the transmitter and the receiver.

One problem with measuring TOA is that the clock of a mobile device may not be synchronized with the clock of the access points. Another problem is that the clock of the mobile device may suffer from drift over time. Yet another problem is that some signals experience obstacles and suffer from multipath errors where the path from the transmitter to the receiver is not along a straight line. These problems result in the three (or more) spheres not intersecting at a single point because time measurement errors cause distance errors and multipath propagation result in longer indirect distances.

Figure 6:
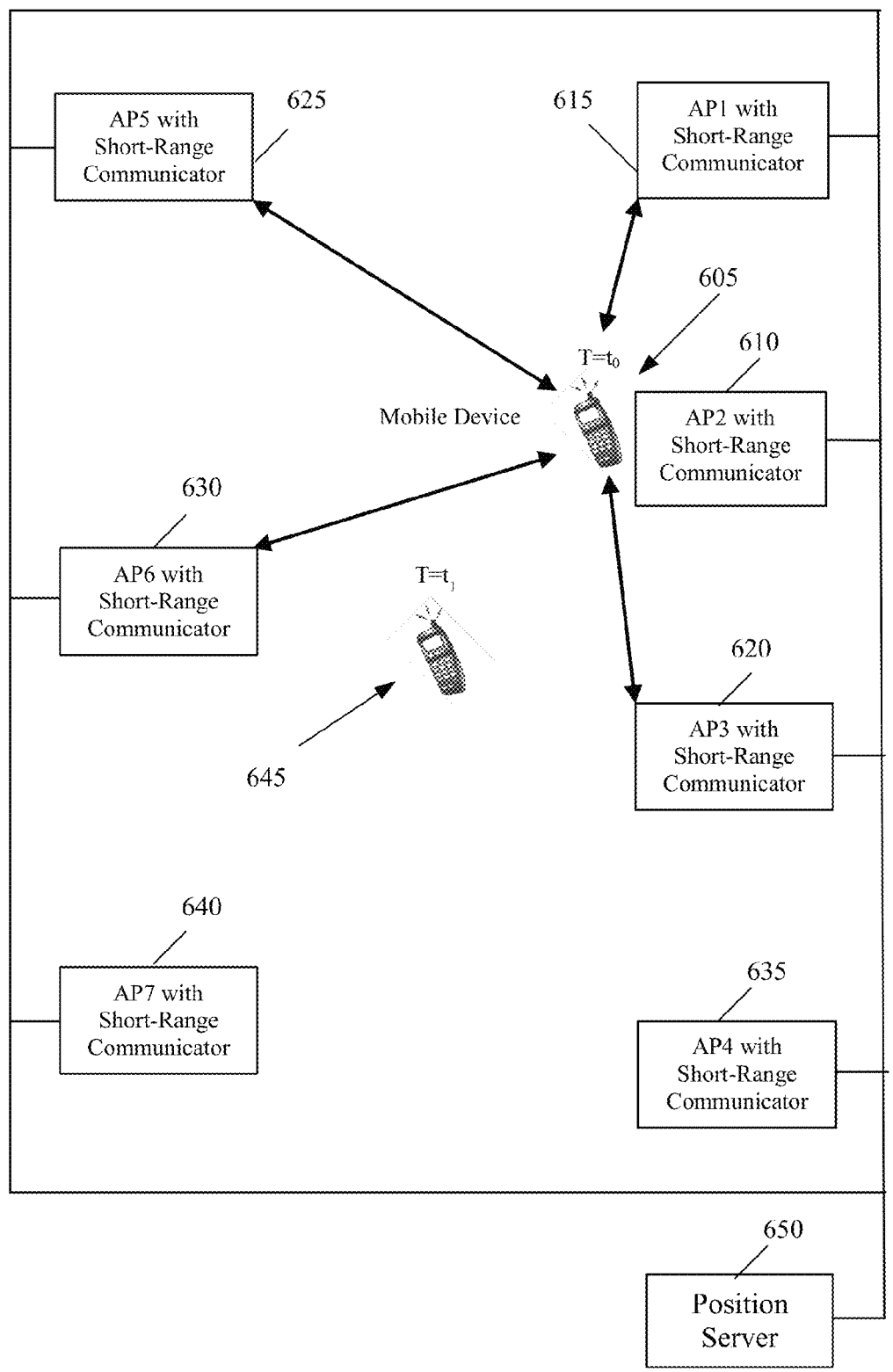
FIG. 6 conceptually illustrates using position reference devices to provide positioning assistance information and correct problems in determining position by using time of arrival of signals in some embodiments of the invention.

FIG. 6 conceptually illustrates using position reference devices to provide positioning assistance information and correct problems in determining position by using time of arrival of signals in some embodiments of the invention. In this example the positions of wireless access points (or base-stations) 610-640 are known from prior measurements or calculations. The position of the access points are stored in each access point, stored in a position server, and/or broad-casted. The access points use a short-range communication protocol to transmit position assistance data to nearby mobile devices. Consider the case where at time $T=t_0$ a mobile device 605 is in close proximity to access point AP2 610 and receives the position of AP2. The mobile device then assumes that its position is the same as that of AP2 and uses that to re-calibrate its TOA access point positioning method. For example, the mobile device finds its clock difference with AP2. Also, AP2 knows its clock differences with the other nearby access points or it uses round-trip measurements to find them. Hence, the mobile device finds its clock differences with other nearby access points and corrects for synchronization and clock drift errors when measuring time delays.

In FIG. 6 the mobile device 605 transmits and measures round-trip TOA information for AP1 615, AP3 620, AP5 625, and AP6 630. The mobile device also receives the position of AP1, AP3, AP5 and AP6 from each access point, from AP2, or from the position server 650. The mobile then calculates its distance to each access point and uses that to compute what the measured round-trip TOA from AP1, AP3 AP5, and AP6 should be. Suppose that the mobile device is receiving multipath transmissions from AP5 instead of the direct path shown in FIG. 6. Then the mobile device receives a round-trip TOA from AP5 that represents a much longer distance than twice the separation distance between the mobile device and AP5. The mobile device in some embodiments disregards TOA measurements from AP5 in a certain size region around AP2 since those measurements are likely to be unreliable. For instance, some embodiments determine that the signal path is affected by multipath when the difference between the calculated and the measured TOA values is more than a predetermined threshold or a predetermined percentage.

Alternatively, the mobile device uses the measured multipath TOA from AP5 and the calculated round-trip TOA for a direct path and uses them to model and apply a correction factor (e.g., linear multiplicative term or non-linear term) to the measured round-trip TOA from AP5. At a later time $T=t_1$ where the mobile device has moved to a new location 645 the mobile device uses its calibrated clock to measure the TOA from nearby access points and uses the point of intersection of the corresponding spheres to compute its position. It can also discard round-trip TOAs that result from multipath, give them a smaller or zero weight in the final position determination, or correct for multipath to obtain the direct TOA.

Another time delay positioning method is the Time Difference Of Arrival (TDOA). With this method access points transmit at the same time at regular intervals or with known time offsets. The mobile device then measures the difference in arrival times between two access points. This method does not require the transmission time to be known because it is a differential approach. Hence, it is more appropriate for cases where absolute time differences are not accurate or are not available. Given the location of two access points, the calculated TDOA of the two access points, and the speed of light, a hyperbolic surface is drawn with the two access points at its foci. This process is performed with three or more pairs of access points. This results in a hyperbolic surface for each pair with the mobile located at the intersection of these surfaces. The correction method mentioned above for the TOA method is also applied in some embodiments to the TDOA method to re-calibrate time differences, and eliminate multipath measurements or compensate for them.

A Service Set Identifier (SSID) is a name that identifies 802.11 wireless LAN access points. WLAN access points transmit beacon messages that publicize their SSID. Nearby client devices typically search for SSIDs and then select which access point and network to connect to from the list of SSIDs they find. In some embodiments a reference device uses a short-range communication protocol to transmit identifying information of all nearby access points. Nearby mobile devices that support that short-range protocol then receive the information and do not have to search for SSIDs. This is another form of position assistance information. The reference device in some embodiments is part of another device such as an access point. The reference device has a pre-stored list of all nearby SSIDs and/or regularly searches for beacons to update the list. Thus, in FIG. 6 access point 2 can monitor nearby access points (AP1, AP3, AP5 and AP6), receive and store their SSIDs, and use its short-range communicator to send that information to nearby mobile devices.

Angle of Arrival Methods (AOA) use the angle of arrival between a transmitter and a receiver to locate a device. Consider FIG. 6 where the access points transmit to the mobile device, or the mobile device transmits to the access points, or a round-trip where the mobile device transmits to the access point and the access points transmits back to the mobile device. In all cases, the direction of the propagating wave is measured. This angle of arrival measurement is either absolute or relative (in the same way that TOA is absolute and TDOA is relative). Consider the absolute AOA case. If two access points with known positions that are non-collinear with respect to the mobile device are used, such as AP5 and AP3 in FIG. 6, then the position of the mobile device can be determined by finding the intersection of two straight line rays from each access point with the measured absolute angles. If the measured angles are relative then three access points are required and the position of the mobile is determined by the intersection of three straight line rays from each access point with the measured relative angles.

In FIG. 6 when the mobile 605 is in close proximity to AP2 610 it receives the position of AP2 with a short-range communication protocol. The mobile then uses the position of AP2 as its position and uses the known positions of nearby access points that are transmitting to calculate its angles with those access points. The calculated angles are then compared with the measured AOAs to form correction factors for calibration. The mobile in some embodiments also identifies angle measurements from access points that are suffering from multipath propagation and discards those access points for nearby areas, gives them a smaller weighting in the final position determination, or compensates for the multipath to calculate the true angle of arrival.

Although the previous TOA, TDOA and AOA descriptions have discussed WLAN 802.11 access points, the same description is true if the access points are cellular base-stations. Cellular networks typically divide a coverage area into a series of cells. Each cell has a cell tower base-station that includes a transmitter, receiver, and antenna. The transmit power of the base-station determines the area of the cell; the larger the transmit power the larger the size of the cell. Indoor coverage of cellular networks in homes, shopping malls and small businesses can also be improved with the use of smaller cellular base-stations called femtocell (with ranges of about 10 meters) or picocells (with ranges of up to 200 meters). Thus, the access points in FIG. 6 can be cellular femtocell base-stations and position reference devices can be used to improve the accuracy of cellular TOA, TDOA, and AOA positioning. The previous discussions also apply to RFID positioning systems since they also use TOA, TDOA, and AOA between RFID readers and tags.

Another approach for position determination is to use the Received Signal Strength Indicator (RSSI) of the incoming radio signals. The detected signal strength at a receiver is inversely proportional to the square of the distance from the transmitter according to free space transmission. Referring back to FIG. 6 a mobile detects the amplitude of the beacon transmissions of nearby access points; AP1, AP2, AP3, AP5 and AP6. Suppose that the position of the access points are measured accurately with commercial grade GPS, surveying, or are estimated from a RSSI data gathering deterministic phase. The mobile device in some embodiments uses a centroid algorithm that weights the position of each access point with the square of its received signal strength. The resulting sum is then normalized by dividing the summation with the sum of the weights; the square of the received signal strengths. In practice, however, effects such as obstacles, interference, and multipath propagation, cause variations to the RSSI that make the method unreliable. The RSSI method in some embodiments is tested and difficult areas that suffer from obstacles and multipath are identified. Position references are then installed at the identified areas. When a mobile device is near a reference device, the mobile device then uses the position of the reference device instead of RSSI.

All of the calibration procedures (TOA, TDOA, AOA, RSSI, GPS) can be repeated at other reference points. For example, in FIG. 6 AP2 is used as a calibration point. The mobile device then moves away from AP2 and uses the calibration and correction from AP2 to find its position. At a later time when the mobile device is in close proximity to AP7 the calibration is repeated since calibration at AP7 is more likely to compensate for multipath effects in the regions near AP7. The mobile's clock drift effects also get worse over time and need to be re-calibrated repeatedly.

Figure 7:
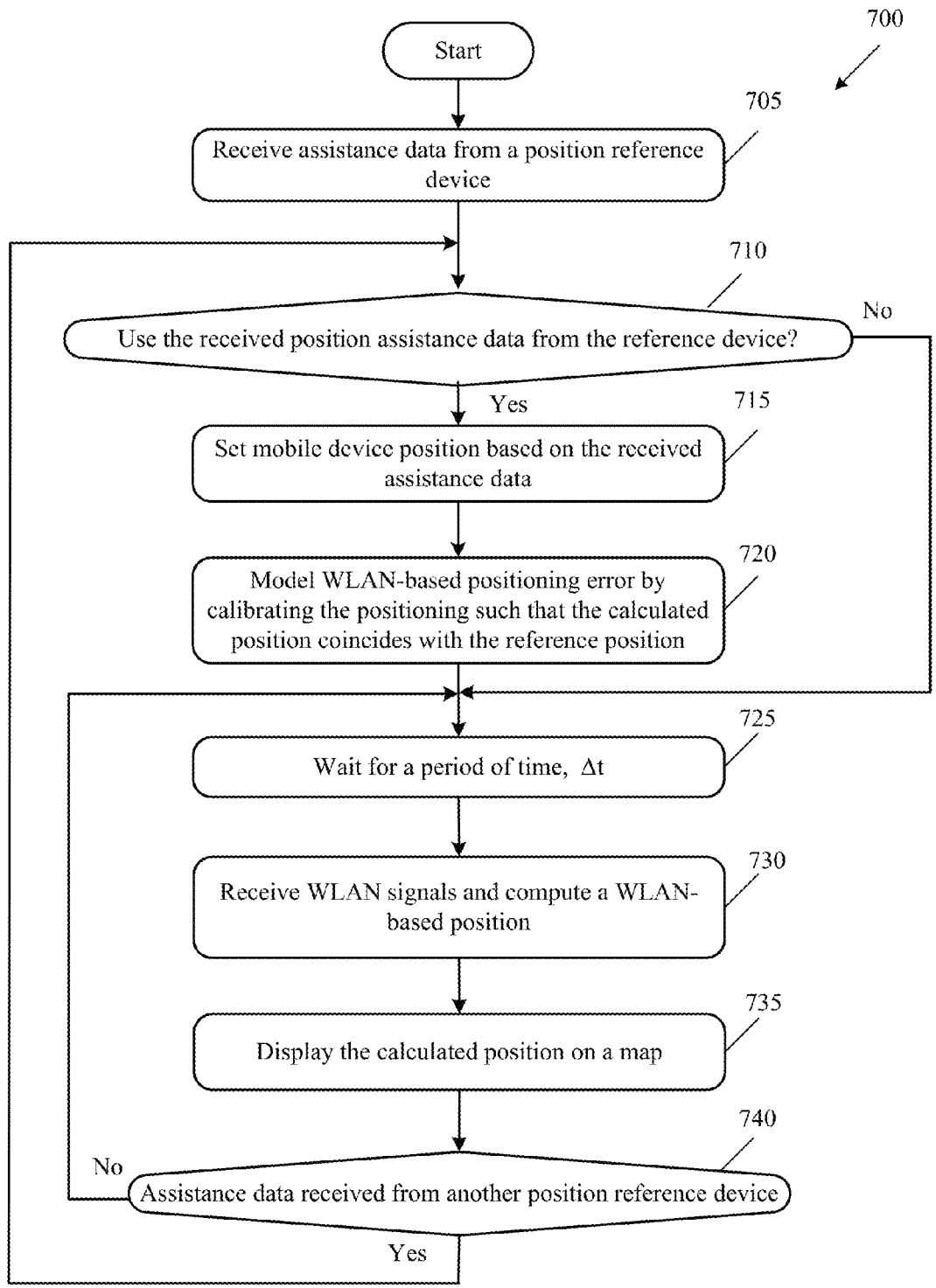
FIG. 7 conceptually illustrates a process that calculates the position of a mobile device by using WLAN signals and calibrating its WLAN positioning with nearby position reference devices in some embodiments of the invention.

FIG. 7 conceptually illustrates a process 700 that calculates the position of a mobile device by using long-range wireless signals such as high-power transmission WLAN signals and calibrating its WLAN-based positioning with nearby position reference devices in some embodiments of the invention. This is similar to FIG. 5 except that the positioning uses measurements based on long-range wireless signals rather than accelerometer measurements. The wireless communication methods used by the position reference devices include short-range signals such as NFC, RFID, Bluetooth®, short-range Wi-Fi, Wi-Fi Direct, and high frequency narrow beam methods such as 60 GHz. The position calculations are performed, e.g., by the mobile device's position engine and processor.

Prior to coming to proximity of a position reference, the mobile device is using received long-range wireless signals to determine its position (e.g., by (i) receiving high-power transmission Wi-Fi, cellular, etc., signals from several transmitters, (ii) doing measurements using TOA, TDOA, RSSI, AOA, etc., and (iii) using a technique such as triangulation to determine its position). As shown in FIG. 7, when the mobile device comes in close proximity to a position reference device, process 700 receives (at 705) position assistance information from the reference device through a short-range wireless protocol. The position assistance information transmitted by the reference device in some embodiments includes one or more of the reference device identification (ID), general information such as its type and whether it is stationary or moving, its short-range communication protocol and its associated transmission power level, its pre-stored or calculated position information, the timestamp for when its own reference position was calibrated, and position assistance data for different methods such as GPS, Wi-Fi, etc.

The process then checks the received information and determines (at 710) whether to use the received information for position re-calibration. This decision in some embodiments is based on the settings of the mobile as was described by reference to FIG. 5, above. When the process decides not to use the assistance data from the reference device, the process proceeds to 725 and continues with the existing WLAN-based positioning as described below. When the process decides to use the assistance data from the reference device, the process sets (at 715) the position of the mobile device to the reference position.

The process models (at 720) the WLAN positioning error by calibrating the WLAN-based positioning such that the calculated position coincides with the reference position. The process then waits (at 725) a time interval $\Delta t$. The process then receives (at 730) WLAN signals and computes (at 730) a WLAN-based position. The received signals (at 730) are the signals that are used for position determinations and not the position assistance data from the position reference device. In some embodiments, the same transmitting device that provides one of the signals for position determination also provides the position reference signal when the mobile device comes close to the transmitting device. For instance, a Wi-Fi access point provides positioning signals by using high-power transmission with a range of tens of meters and provides a low-power short range position reference signal when the access point determines that a mobile device has come to the vicinity (e.g., less than 5 meters, less than 2 meters, less than 1 meter, etc.) of the access point.

Next, the process optionally displays (at 735) the computed position on a map of the mobile device display. The process then determines (at 740) whether assistance data is received from another position reference device. If not, the process proceeds to 725 and the operations of computing a WLAN-based position and map display at regular $\Delta t$ time intervals until the mobile device comes near another position reference, at which point the process receives new position assistance information and proceeds to 710 to repeat the re-calibration operations again.

B. GPS Positioning Re-Calibration with Short-Range Wireless Assistance Data

Global Positioning System (GPS) receivers provide location information by communicating with satellites that orbit the earth. A GPS receiver typically locates four or more satellites and calculates the distance to each satellite by timing a radio signal from each satellite to the receiver. In order to use this timing information the receiver has to know the location of the satellites. Since the satellites travel in known orbit paths the GPS receiver can receive and store the ephemeris and/or almanac that tells the receiver the location of the satellites at various times. Slight variations on the positions of the satellites caused by planetary gravitational pulls are also monitored by the Department of Defense and transmitted by the satellites themselves as part of their signals to the receivers.

A GPS receiver uses the distance/timing information and the location of the satellites to calculate its own position. The distance from each satellite limits the location of the GPS receiver to a sphere centered on the satellite location with a radius equal to the distance to the satellite. The intersection of the four spheres (one for each satellite) provides the location of the GPS receiver. In order for the GPS receiver to measure the travel time between the satellite signal and the receiver the satellite transmits a pseudo-random code pattern. The receiver also starts playing the same pattern. After the satellite signal reaches the receiver it exhibits a delay lag compared to the receiver pattern. This delay represents the signal travel time. Both the satellite and the receiver must use the same clock time in order to measure this delay. The satellites use expensive atomic clocks, whereas the receivers use in-expensive clocks that are re-calibrated at frequent time intervals. The receiver looks at four or more signals from different satellites. It then draws the corresponding four or more spheres. If there is time inaccuracy for the receiver's clock the spheres will not intersect at one point since they will all be offset by the same time error. The receiver can then adjust its clock until the spheres intersect at a single point, thereby synchronizing with the atomic clocks of the satellites.

Autonomous GPS receivers receive information from orbiting satellites and perform the calculations themselves in order to locate their position. The information they download from the satellites includes satellite ID, almanac, clock corrections and ephemeris. They use this information along with their measured pseudo range data to calculate position and velocity. Assisted GPS systems use assistance data from an assistance server. The mobile's assisted GPS receiver measures pseudo ranges and Doppler, and obtains assisted data from the assistance server.

Figure 8:
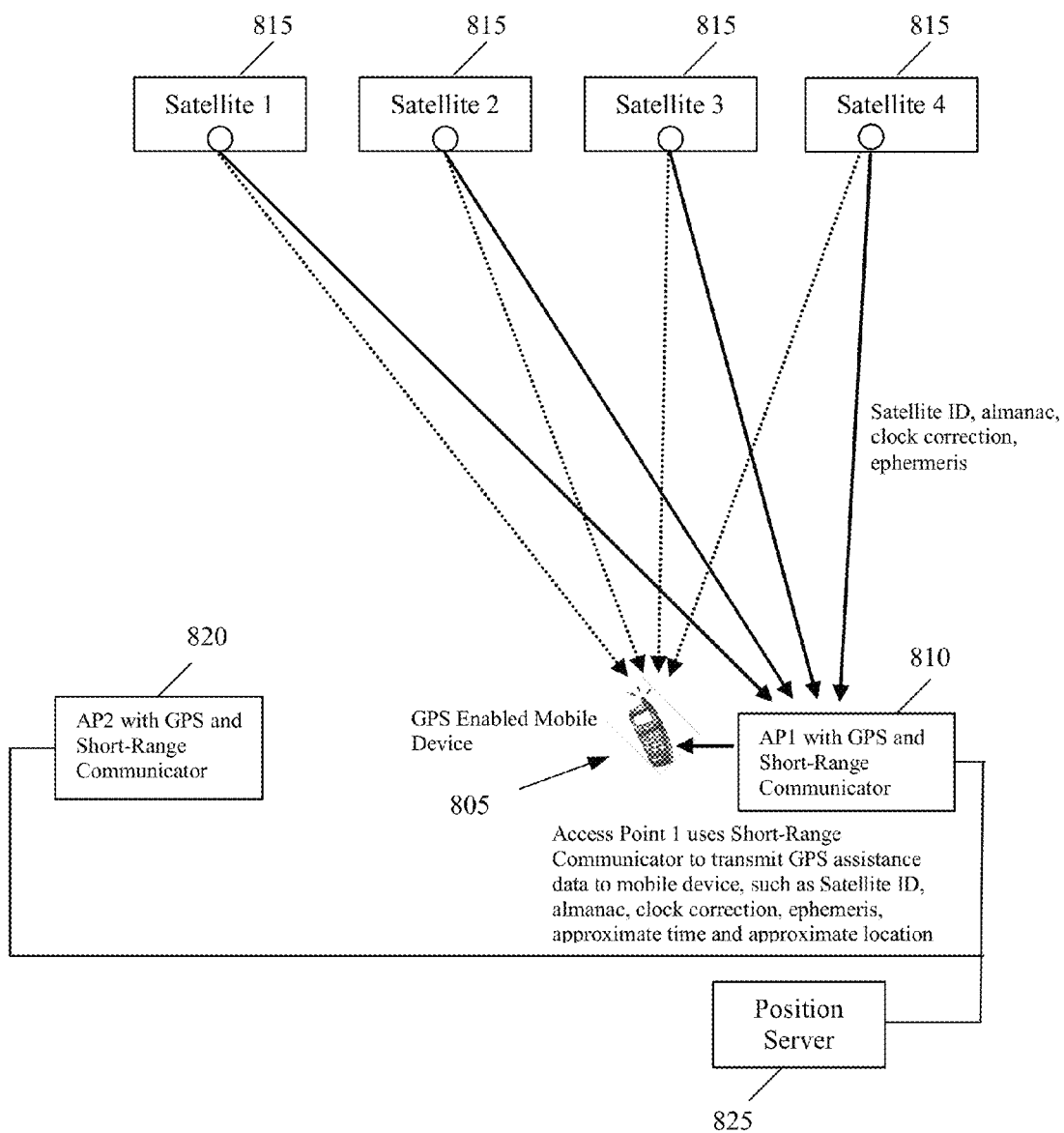
FIG. 8 conceptually illustrates positioning with assistance data provided by the short-range communicator of position reference wireless access points in some embodiments of the invention.

FIG. 8 conceptually illustrates positioning with assistance data provided by the short-range communicator of position reference wireless access points in some embodiments of the invention. The figure shows a mobile device that is equipped with a GPS receiver. The mobile device 805 is in close proximity to a fixed location wireless access point 810 that is equipped with a GPS receiver and acts as an assistance server to nearby GPS receivers. The access point uses its GPS receiver and its known position to acquire GPS assistance data. The access point then uses its short-range communicator to transmit the GPS assistance data to nearby wireless devices that also have the same short-range communicator. The short-range wireless communicator can be NFC, RFID, Bluetooth®, short-range Wi-Fi, Wi-Fi Direct, and high frequency narrow beam such as 60 GHz. The assisted data transmitted by the access point in some embodiments includes information about which satellite IDs it sees and with what delays, almanac, clock corrections, ephemeris, approximate time, and approximate location. The mobile device in FIG. 8 then receives the assistance data and its GPS receiver uses the data to calculate a more accurate position. Assistance data also speeds up the mobile's GPS receiver signal acquisition times. As described by reference to FIG. 3, above, the position reference devices used in the embodiments of the invention are low-cost widely used short-range devices that use protocols such as NFC, Bluetooth®, RFID, and Wi-Fi that are in many consumer electronic devices. The position reference devices in these embodiments calibrate the GPS positioning of a phone or a laptop or tablet that is inside the car as opposed to just calibrate a dedicated GPS system inside the car. Also the disclosed method is an absolute correction method because absolute position is provided, whereas previous GPS correction methods such as DGPS are differential correction methods.

Some GPS errors such as those caused by clocks, the atmosphere and orbit deviations produce similar errors over large areas and can be corrected by differential correction methods. In FIG. 8 the access point can continuously receive signals from the satellites 815, calculate its distance to each satellite based on the signal delays, and compute its position. The difference between the access point's known location and its calculated location is a measure of the positioning error affecting that GPS receiver at that location at each time instance. The access point can calculate the correction needed to compensate for the error at each time instance. For example, the access point in some embodiments calculates the delays it should be seeing for each satellite and compares them with the received delays to compute the delay corrections for each satellite at a given time instance. The access point then transmits that correction to nearby mobile devices. The correction data is most accurate near the access point. Thus, as the mobile moves away from the access point it may use a different correction factor. In FIG. 8 both AP1 810 and AP2 820 can act as fixed location reference GPS assistance and differential assistance servers. As the mobile moves closer to AP2 it may receive and use AP2's correction data instead of those of AP1. In some embodiments, when a mobile device receives correction data from several access points, the mobile device determines the closest access point (e.g., by using signal strength or other means) and uses only its correction data, or alternatively gives weights and uses all correction data where higher weights are given to closer reference points. The access points and the mobile device are connected (wired or wirelessly) to a network and can communicate with a networked position server 825. The position server stores data, performs position calculations, coordinates and synchronizes the clocks (not shown) of access points, and downloads or uploads information.

With multipath propagation some satellite signals are received at GPS receivers through indirect paths with longer time delays. Fixed location reference access points in some embodiments use their location and that of the orbiting satellite to determine what the direct path delay to a particular satellite should be. If the difference is significant only for a particular satellite then it is likely due to multipath. Mobile receivers then ignore that satellite in some embodiments while the reference receivers are flagging it as multipath. Alternatively, the mobile devices use the difference as a correction factor. Also, multipath areas are flagged in some embodiments so additional fixed location reference points are installed to help navigation in those areas.

The flow diagram for GPS-based positioning re-calibration is similar to FIG. 7. The process of FIG. 7 uses signals from transmitters to determine positioning. The only difference is that when the mobile device resets its position it resets the GPS-based positioning error by calibrating the GPS-based positioning such that the calculated position coincides with the reference position. At a later time the mobile then receives GPS signals and computes a calibrated GPS-based position.

IV. Combined Positioning Re-Calibration with Short-Range Wireless Assistance Data Using Multiple Signals Received from a Position Reference Device The previous sections described position re-calibration for accelerometer, WLAN/cellular, and GPS. A mobile device, however, can have multiple radios (e.g., as described by reference to FIG. 1) and positioning methods in some embodiments. A position reference device can therefore be used to re-calibrate multiple positioning methods of a mobile and provide assistance data to them.

Figure 9:
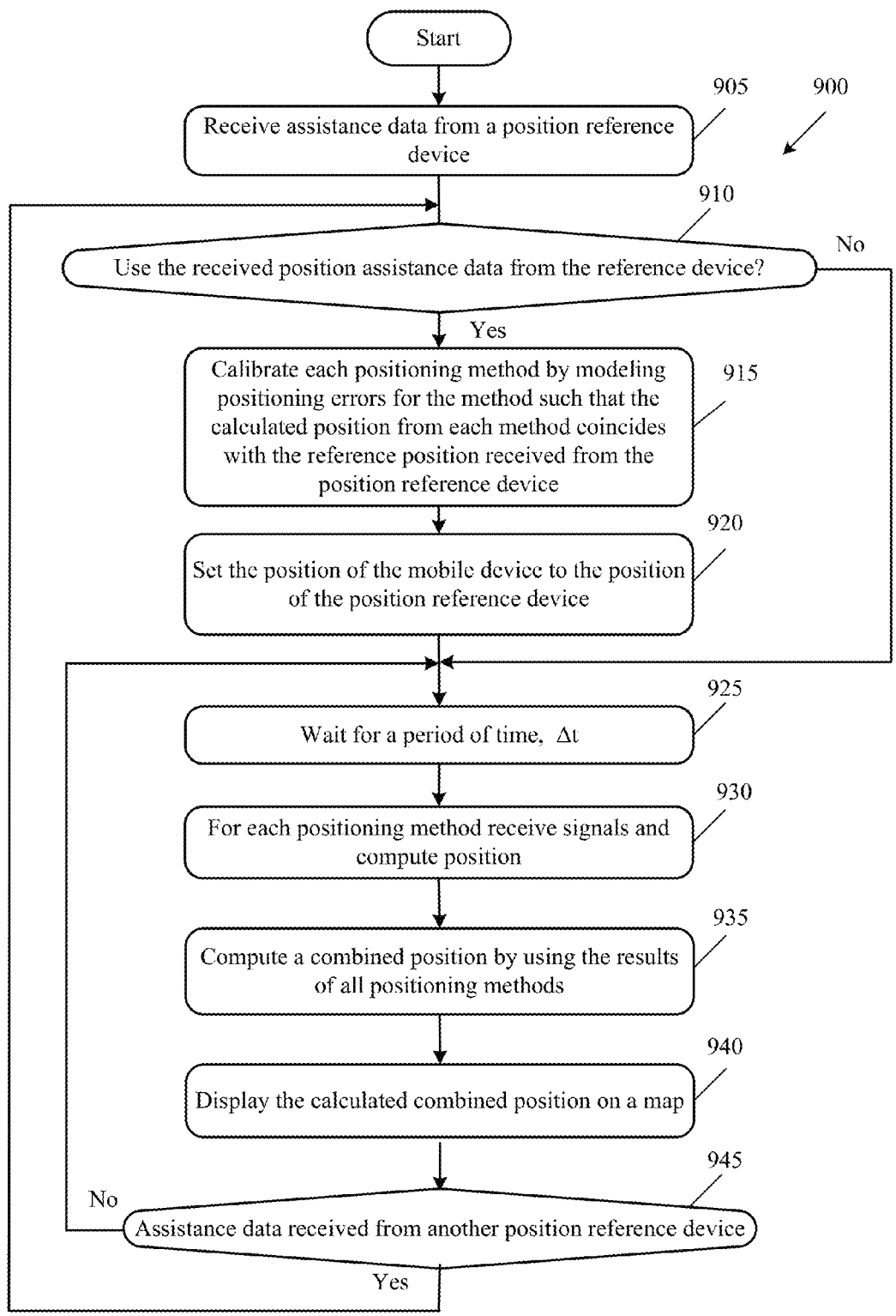
FIG. 9 conceptually illustrates a process that calculates the position of a mobile device by using multiple positioning methods and calibrating them with nearby position reference devices in some embodiments of the invention.

FIG. 9 conceptually illustrates a process 900 that calculates the position of a mobile device by using multiple positioning methods and calibrating them with nearby position reference devices in some embodiments of the invention. This flow diagram is similar to FIG. 7, except that there are multiple positioning methods that are re-calibrated, and the calculated final position of the mobile is a weighted sum of all positioning methods.

The mobile device uses signals received through multiple radios, determines location of the mobile device by using positioning methods that correspond to each radio, and sets the location of the mobile device to a weighted sum of the locations calculated by each method. As the time goes on, different sources of error such as lack of direct line of sight and existence of multipath, metal objects, reflective surfaces, dead-spots, noise and interference between the transmitters and receivers cause the positioning methods to lose their accuracy and go out of calibration.

As shown in FIG. 9, when the mobile device comes in close proximity to a position reference device, process 900 receives (at 905) position assistance information from the reference device through a short-range wireless protocol. The position assistance information transmitted by the reference device in some embodiments includes one or more of the reference device identification (ID), general information such as its type and whether it is stationary or moving, its short-range communication protocol and its associated transmission power level, its pre-stored or calculated position information, the timestamp for when its own reference position was calibrated, and position assistance data for different methods such as GPS, Wi-Fi, etc. The process then checks the received information and determines (at 910) whether to use the received information for position re-calibration. This decision in some embodiments is based on the settings of the mobile device as was described by reference to FIG. 5, above.

When the process decides not to use the assistance data from the reference device, the process proceeds to 925 and continues with the existing positioning methods as described below. Otherwise, when the process decides to use the assistance data from the reference device the process calibrates (at 915) the positioning methods so the calculated position from each method coincides with the reference position. Thus, if the mobile device has 802.11 radio module 120 (as shown in FIG. 1), the mobile device receives WLAN signals through antenna 135. The position engine 180 and processor 150 then use the WLAN signals to compute a WLAN-based position, and if the computed position does not coincide with the reference position then position engine 180 and processor 150 calibrate their WLAN-based positioning algorithm until the computed WLAN-based position coincides with the reference position. This calibration is repeated for other radio modules such as GPS module 110, Bluetooth module 115, cellular module 105, 60 GHz module 122 or other high frequency radios with beam-forming 125, and RFID. Thus, all positioning methods have been calibrated so that their computed positions coincide with the reference position. The process also identifies (at 915) the computed positioning errors for each positioning method prior to calibration and determines weights for each method, where larger weights are given to more accurate positioning methods that have smaller computed positioning errors. These weights are used (e.g., at 935, described below) to compute a combined position from all the positioning methods.

It should be appreciated that the position reference device does not necessarily need to have multiple antennas or to support any communication protocol that the mobile device uses for positioning. As long as the position reference device and the mobile device are capable of communicating with each other through at least one protocol that is supported by both devices, the mobile device can receive the position assistance data including the pre-stored or calculated position information of the position reference device. This information is then used to calibrate positioning methods for all radio types supported by the mobile device. For instance, the mobile device can use 802.11 and RFID protocols for position calculation while the mobile device and position reference device communicate using NFC for providing assistance data to the mobile device. As another example, the mobile device can receive high power transmission signals from a set of transmitters through the 802.11 radio to determine position and receive low power transmission signals through the 802.11 radio from one of those transmitters (or a different transmitter) that is nearby to receive assistance data. Similarly, the mobile device can receive RFID signals from transmitters operating in the microwave band (3.1-10 GHz with range of up to 200 meters) for position determination and receive position assistance data from an RFID transmitter operating in high frequency (HF) band (13.56 MHz with a range of up to 1 meter). The process then sets (at 920) the position of the mobile device to the reference device position (i.e., the pre-stored or calculated position of the position reference device).

The process then waits (at 925) a time interval $\Delta t$. The process then receives (at 930) signals for each of its positioning methods and computes a calibrated position for each method. The process then combines (at 935) the different positions by weighting each appropriately. Different embodiments use different normalized weights as simple as using 1 for one positioning method and zeros for the rest (e.g., pick GPS and ignore others), using equal weights, using weights based on historical accuracy of each positioning method, or using a confidence measure for each positioning method. For instance, the confidence in a GPS positioning method is high if many satellites are seen by the mobile's GPS receiver. Likewise, a WLAN TOA method has a high confidence if many WLAN access points are nearby and the triangulation of their data coincides at a single point. The reverse is also true where if some GPS or access points are not in view the confidence number is lower. After the process computes a combined position the process optionally displays (at 940) the position on a map on the mobile device display.

The process then determines (at 945) whether assistance data is received from another position reference device. If not, the process proceeds to 925 and the operations of computing a position for each positioning method, computing a combined position, and map display are repeated at regular $\Delta t$ time intervals until the mobile device comes near another position reference, at which point the process receives new position assistance information and proceeds to 910 to repeat the re-calibration operations again. The combined final position in some embodiments has a separate confidence measure assigned to it. For instance, if all the different positioning methods (e.g., GPS, Accelerometer, WLAN) give position values that are highly correlated and close to each other than the combined position has a high confidence measure.

V. Alternative Embodiments

A. Encrypting Position and Assistance Data

In some embodiments the reference device encrypts the assistance data and/or points to a server for encryption purposes. For instance, the reference point can be part of a Wi-Fi or cellular network. The position reference transfers a URL to a nearby mobile device. Then if the mobile device is not registered with that network it is denied access. For example, the network can be by a service provider (e.g., AT&T) and if the mobile device user is not registered with that service provider the mobile device cannot access that URL and/or get the decryption key. The network service provider knows the position of powered up registered mobile devices that are using its network. The service provider therefore is able to act as a certificate authority for the powered up registered mobile devices. Alternatively, the service provider in some embodiments has an agreement with an intermediary third party (e.g., McDonalds) such that the intermediary has certain locations where it gets the data from the service provider and presents it to mobile devices.

B. Weighting Position and Assistance Data Received from Multiple Position Reference Devices FIG. 10 conceptually illustrates a mobile device that receives position and assistance data from several position references with different short-range communication methods and different calibration time-stamps, and gives different weights to them in some embodiments of the invention. For instance, in one scenario where user 1's mobile device receives position reference and assistance data from several reference devices, the mobile device weights their position and assistance data based on how far they are from the mobile device. If the reference devices are moving then the weights also take into account how recently the reference devices were calibrated. The position reference devices are connected to a network 1050 and can communicate with a networked position server 1055. The position server stores data, performs position calculations, coordinates and synchronizes the clocks of reference points and access points, and downloads or uploads information.

Figure 10:
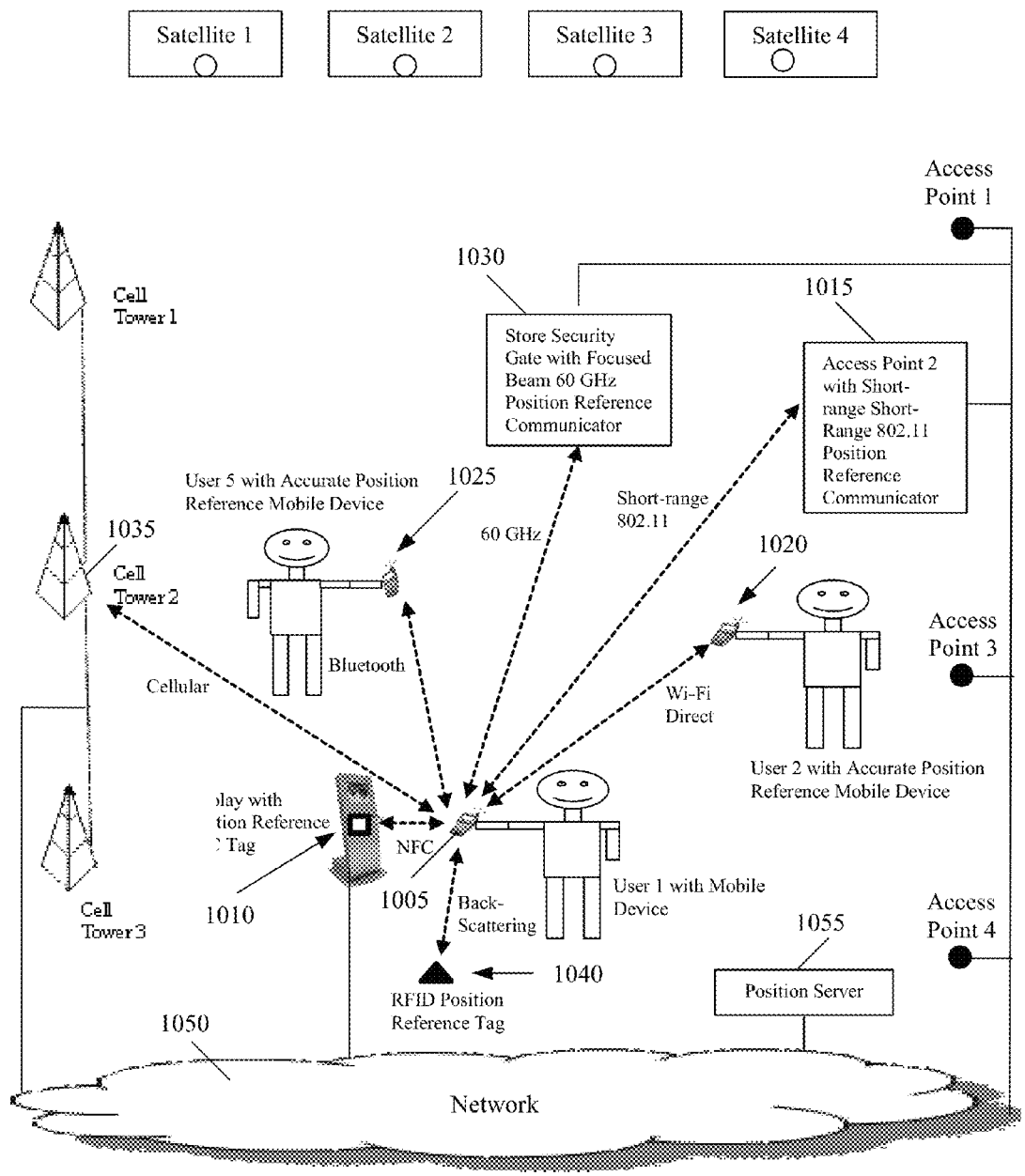
FIG. 10 conceptually illustrates a mobile device that receives position and assistance data from several position references with different short-range communication methods and different calibration time-stamps, and gives different weights to them in some embodiments of the invention.

In FIG. 10, the mobile device 1005 of user 1 uses its NFC communicator to power up a passive NFC tag 1010 and receive position assistance data from it. The mobile device also uses its RFID reader to receive assistance data from an RFID tag 1040. The mobile device of user 1 also uses its 802.11 radio to receive assistance data from 802.11 access point 2 1015 that is transmitting with low power to reduce its range. The mobile device 1005 also uses its 60 GHz transceiver to receive assistance data from the 60 GHz communicator of a store security gate 1030. The cellular receiver of the mobile device receives assistance data from a reference cellular base-station 1035. There are also two moving reference points that are close to user 1. User 2 has a mobile device 1020 that uses Wi-Fi Direct to transmit assistance data to the mobile of user 1, and user 5 has a mobile device 1025 that is using Bluetooth® to transmit assistance data to the mobile of user 1. The mobile device of user 1 can then combine the position assistance data from different references based on a confidence measure. Some strategies for this confidence measure are as follow.

Some embodiments weight assistance data based on distance. The closer a reference device is to a mobile device the more accurate is the position assistance data of that reference device for that mobile device. Thus, a mobile device may choose to use only the assistance data of the nearest reference point. For example, in FIG. 10 the mobile device can select to use the position and assistance data from the NFC tag and ignore the rest because the range of NFC is very small and the mobile device has to be very close to it in order to be able to communicate with it. Alternatively, rather than ignoring the other reference devices the mobile device can assign weights based on the range of the short-range communication protocol. Thus, reference position and assistance data that is received with an NFC communication protocol is given the highest weight. Likewise, smallest weights or zero weights are given to assistance data that are received from a reference point with a cellular protocol because of the large range of cellular signals. The weights may also take into account the strength of the received signals. For example, if two reference devices are using the same short-range protocol with similar transmit power but the mobile device receives a stronger signal from one versus the other, the stronger signal reference is given a higher weight because the mobile device is closer to that reference device.

Some embodiments weight assistance data based on calibration timestamp: When a reference device is moving it is important to note the time when its position (and hence its positioning methods) were calibrated. This is because its positioning errors accumulate over time until they are removed or reduced by a nearby position reference point. There is therefore greater confidence in a more recently calibrated moving reference point. For example, suppose in FIG. 10 the position of the mobile device 1020 of user 2 is much more recently calibrated compared to the mobile device 1025 of user 5. Both devices transmit the timestamp at which they were calibrated to the mobile device 1005 of user 1. The mobile of user 1 may then accept only the assistance data of user 2's mobile, or give it a higher weight.

A mobile reference device may also have multiple positioning methods, some of which are more recently calibrated. For example, the GPS assistance data of user 2's mobile may be more accurate because it is more recently updated compared to its TOA/TDOA/RSSI/AOA methods. User 2's reference mobile device then transmits a timestamp for each of its assistance data. User 1's mobile device then receives the data and gives a higher weight to the GPS assistance data compared to the TOA/TDOA/RSSI/AOA assistance data.

Figure 11:
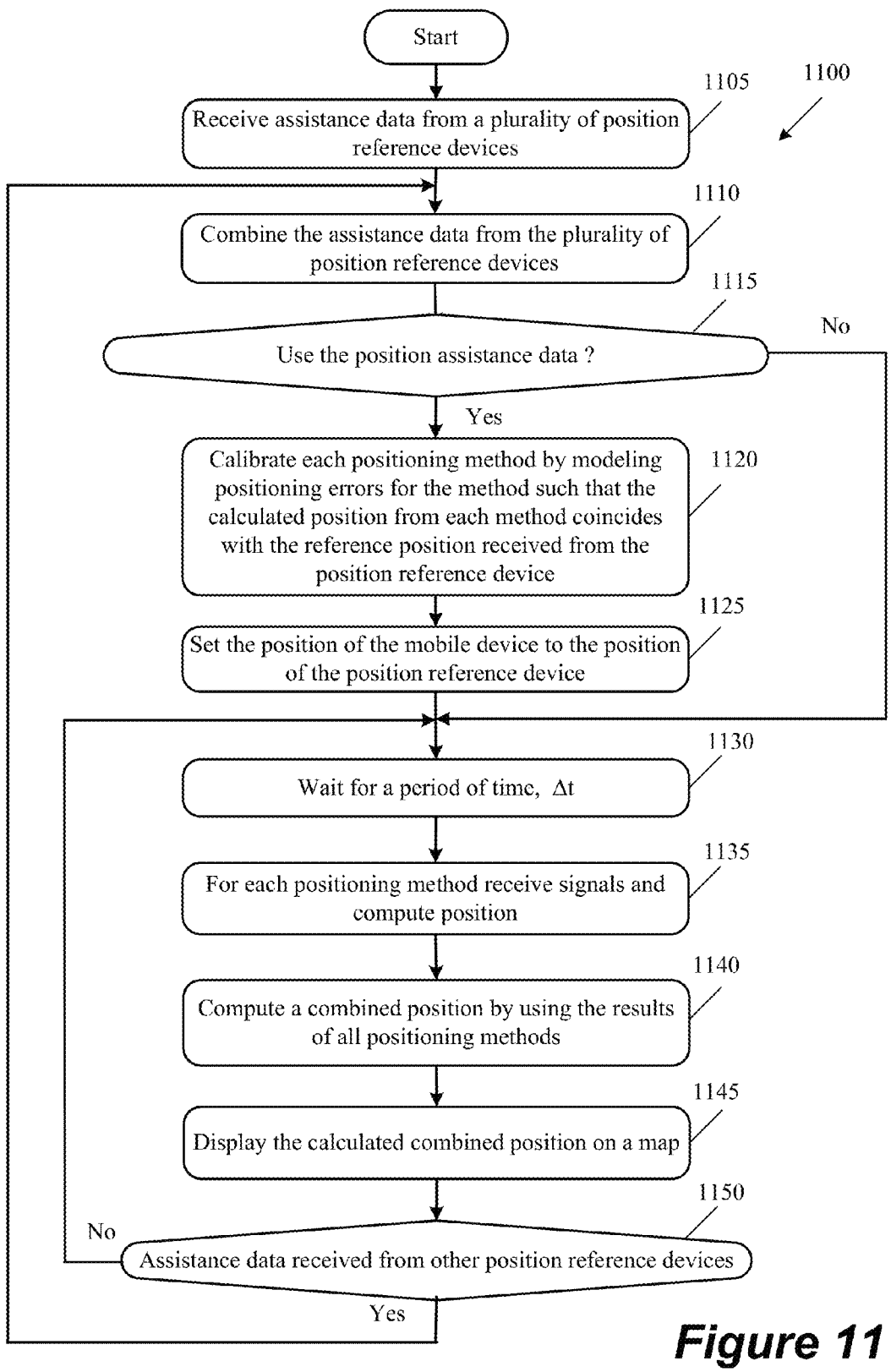
FIG. 11 conceptually illustrates a process for combining assistance data from several reference devices, calibrating a mobile device's positioning methods and computing a combined position in some embodiments of the invention.

A hybrid weighting scheme is also possible were the weights include both the reference device's short-range communication protocol and the reference device's calibration timestamp. FIG. 11 conceptually illustrates a process 1100 for combining assistance data from several reference devices, calibrating a mobile device's positioning methods and computing a combined position in some embodiments of the invention. This process is similar to process 900 in FIG. 9 except that there are several position reference devices near the mobile device. When the mobile device comes in close proximity to more than one position reference devices, process 1100 receives (at 1105) position assistance information from the plurality of position reference devices. The process receives position assistance information from the reference devices through short-range wireless protocols. The position assistance information transmitted by the reference devices in some embodiments includes their identification (ID), general information such as their type and whether they are stationary or moving, their short-range communication protocol and associated transmission power level, their pre-stored or calculated position information, the timestamp for when their own reference position was calibrated, and/or position assistance data for different methods such as GPS, Wi-Fi, etc. The process then combines (at 1110) the position and assistance data from the plurality of reference devices by weighting them in a manner that was described above.

The process then determines (at 1115) whether to use the assistance data. The rest of the steps are as in FIG. 9. The steps of computing a position (at 1135) for each method, computing a combined position (at 1140) and optional map display (at 1145) are repeated at regular Δt time intervals (after the wait at 1130), until the mobile device comes near new position references that were not in the initial plurality of reference devices, at which point the process receives new position assistance information. The process then proceeds to 1110 and the operations repeat again.

Figure 12:
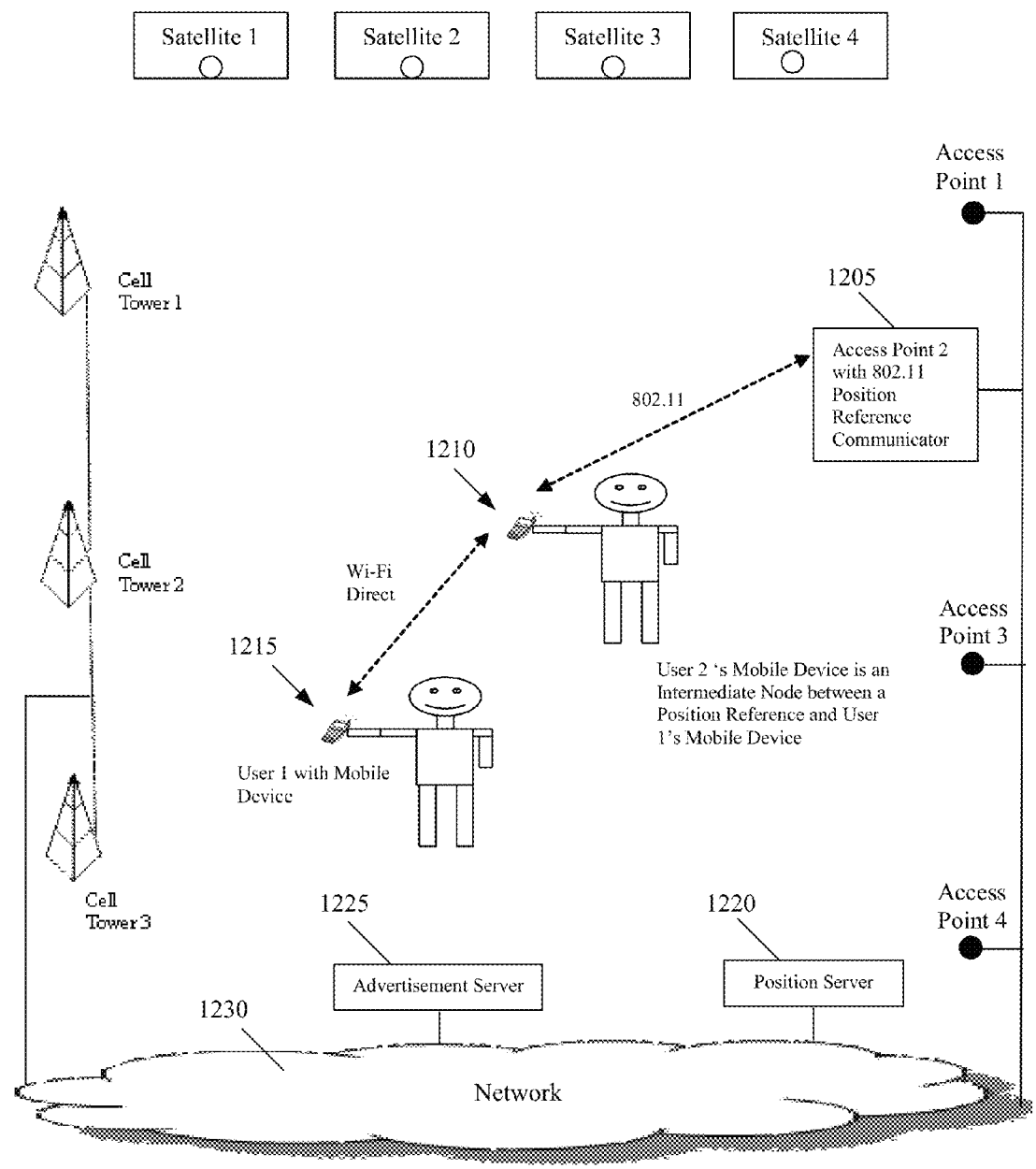
FIG. 12 conceptually illustrates a mobile device that receives assistance data from a reference device indirectly through another device in some embodiments of the invention.

C. Receiving Assistance Data of a Position Reference Indirectly Through Another Device In the previous descriptions position references transmit assistance data directly to mobile devices with short-range communication protocols such as NFC, RFID, Bluetooth®, short-range Wi-Fi, Wi-Fi Direct, and high frequency narrow beam methods such as 60 GHz. FIG. 12 conceptually illustrates a mobile device that receives assistance data from a reference device indirectly through another device in some embodiments of the invention. In this example access point 2 1205 uses 802.11 (with regular power or low-power for shorter range) to transmit assistance data to the mobile device 1210 of user 2. The mobile device 1210 uses a P2P connection such as Wi-Fi Direct to transmit the information to the mobile device 1215 of user 1. There are other ad-hoc or mesh network configurations that can also achieve the same result. For example the P2P connection between the two mobile devices could be Bluetooth® or some other protocol. The communication between the reference point 1205 and the intermediate node 1210 can also be other short-range protocols such as NFC, RFID, Bluetooth®, 60 GHz, etc. There could also be a multi-hop situation where there are more than one intermediate node device between the reference device and the mobile device of user 1. FIG. 12 in some embodiments operates in a push model where the reference point broadcasts its assistance data (e.g., in beacons) and intermediate nodes act as repeaters. FIG. 12 in some embodiments operates in a pull model where user 1's mobile makes a request to user 2's mobile; user 2's mobile searches and finds the reference point and requests assistance data; and user 2's mobile forwards any received data to the mobile device of user 1.

The use of intermediate nodes is useful in situations where the mobile cannot communicate with the reference point directly. This could occur for several reasons. For example, the position reference device and the mobile device of user 1 may not support the same short-range communication protocols, and one (or more) intermediate node(s) act as a protocol bridge. Another reason could be because the range of the reference point device is too short to reach the mobile device of user 1 and one or more intermediate nodes extend the range. Yet another reason could be that there are obstacles between the reference point and the mobile device of user 1 and an indirect path is necessary.

D. Using Optical or Acoustical Methods to Transfer Position Assistance Data

Reference devices in some embodiments utilize optical or acoustical methods to transfer position assistance data to nearby mobile devices. For instance, optical RFID uses optical readers and optical tags that use electromagnetic waves in the THz region of the spectrum (1014 Hertz). Time-of-flight of ultrasound transmissions from a transmitter to a receiver can be used to measure distances for triangulation methods. Infra-Red (IR) methods can also be used where a direct line of sight is required for information transfer.

E. Sending Advertisements in Addition to Sending Transfer Position Assistance Data In some embodiments, the reference devices serve advertisements in addition to positioning assistance to nearby mobile devices. For instance, in FIG. 4 the mobile user would not only see the position on the map but products, services, and deals that are near that location. The advertising information are either pre-programmed in the reference devices, or dynamically updated and retrieved from a server on the network 1230 such as a position server 1220 or a dedicated advertising server 1225. Fixed reference nodes as well as moving nodes and intermediate nodes such as User 2 in FIG. 12 also receive a portion of the revenues that are generated from the advertisements in some embodiments. For example, the advertisement server 1225 in FIG. 12 targets ads that are related to nearby products, and deals to access point 2. Access point 2 then forwards the ads to user 2's mobile and user 2's mobile forwards the advertisement to user 1's mobile device together with the position assistance data. If user 1 purchases the advertised product the seller would pay the advertisement server company. The advertisement server company would then pay a portion of the revenues to the access point 2 company (or store that hosts it) and user 2. The seller may also pay each party directly.

VI. Electronic System

Figure 13:
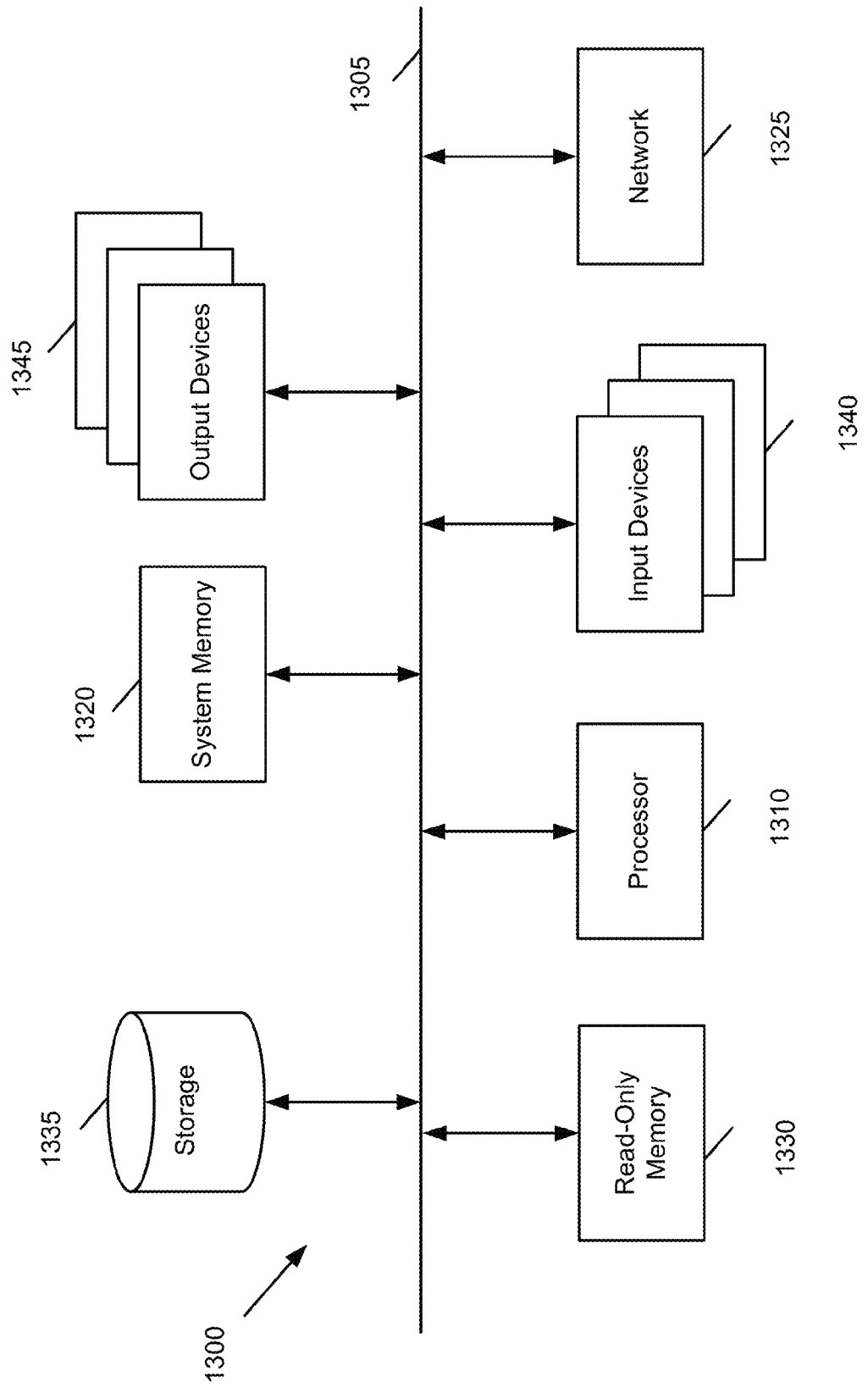
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, server, etc.), phone, PDA, or any other sort of electronic or computing device. Such an electronic system includes various types of computer readable media and interfaces for various other types of computer readable media. Electronic system 1300 in some embodiments includes a bus 1305, processing unit(s) 1310, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1320, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor needs at runtime. In some embodiments, the invention's processes are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of this specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (e.g., FIGS. 5, 7, 9, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of determining a position of a mobile device and calibrating a positioning system of the mobile device, the method comprising:
   receiving a plurality of signals from a plurality of transmitting devices;
   using the positioning system of the mobile device, setting the position of the mobile device to a position calculated based on the received signals;
   receiving a position of a position reference device using near field communication (NFC) electromagnetic coupling in an NFC mode, wherein the mobile device provides an electromagnetic field and the position reference device responds by modulating and backscattering the position of the position reference device;
   setting the position of the mobile device from said calculated position to the position of the position reference device; and
   calibrating the positioning system of the mobile device such that the calculated position of the mobile device using the positioning system coincides with the received position of the position reference device.

2. The method of claim 1, wherein calibrating the positioning system of the mobile device comprises:
   calculating a correction factor for the positioning system of the mobile device using the position of the reference device; and
   applying the correction factor to the position calculated based on the received signals.

3. The method of claim 1 further comprising iteratively waiting for a predetermined amount of time and performing said receiving of a plurality of signals and said setting the position of the mobile device to a position calculated based on the received signals until further position from a position reference device is received.

4. The method of claim 1 further comprising receiving a transmission power level of the position reference device, wherein calibrating the positioning system of the mobile device comprises:
   determining a distance of the position reference device and the mobile device based on a difference between the transmission power level of the position reference device and a power level of signals received from the position reference device; and
   using the position of the position reference device to calibrate the positioning model only when the distance is less than a predetermined threshold.

5. The method of claim 1, wherein the position reference device is a first position reference device, the method further comprising:
   receiving positioning assistance data from a second position reference device, the positioning assistance data received from the second position reference device comprising a pre-stored or calculated position of the second position reference device and at least one of the second position reference device identification (ID), a type of the second position reference device, an indication whether the second position reference device is stationary or moving, a short-range communication protocol supported by the second position reference device and an associated transmission power level, a timestamp indicating when a reference position associated with the second position reference device was calibrated, and position assistance data for a set of positioning methods supported by the second position reference device; and
   determining whether to set the position of the mobile device to the position of the second position reference device based on the positioning assistant data received from the second position reference device.

6. The method of claim 1, wherein the position of the position reference device is received from the position reference device.

7. The method of claim 1, wherein the position of the position reference device is received from a position server communicatively coupled to the mobile device.

8. The method of claim 1, wherein a transmit power and an operating frequency of the position reference device is changed to adjust an operating range of the position reference device.

9. The method of claim 1, wherein the positioning system of the mobile device measures one of a (i) single trip Time Of Arrival (TOA), (ii) round-trip TOA, (iii) Time Difference Of Arrival (TDOA), and (iv) Angle Of Arrival (AOA) of the received signals to calculate the position of the mobile device, wherein calibrating the positioning system comprises reducing an effect of errors comprising at least one of clock drifts, multipath propagation, synchronization errors, and measurement errors in calculating the position of the mobile device.

10. The method of claim 1, wherein the mobile device receives positioning assistance data from the position reference device using near field communication (NFC) in a peer-to-peer (P2P) mode, wherein the position reference device and the mobile device each comprises a power source, NFC antenna circuits, and NFC coils, wherein the mobile device and the position reference device each turn off a corresponding RF field by turning off power from the corresponding power source to the corresponding NFC antenna circuits and the corresponding NFC coils when receiving data.

11. The method of claim 1, wherein the position reference device is located in one of a smart poster, a kiosk, an ATM machine, a mall, a store check out counter, a store security gate, a wireless access point, a cellular base-station, a toll booth, a traffic light, and a street lamp post.

12. The method of claim 1, wherein the mobile device is one of a cellular phone, a personal digital assistant (PDA), a laptop, a tablet, a digital video camera, a video game player, a wireless headset, a wireless mouse, a wireless keyboard, a pager, an external hard drive, a toy, an electronic book reader, a sensor, a CD/DVD/cassette/MP-3 player, an electronic appliance, and an automobile.

13. The method of claim 1, wherein the mobile device comprises a graphical user interface, the method further comprising:
receiving a selection through the graphical user interface to perform manual position re-calibration requiring a user approval to set the position of the mobile device; and
receiving an approval for setting the position of the mobile device before setting the position of the mobile device to the position of the position reference device.

14. The method of claim 1, wherein the mobile device comprises a graphical user interface, the method further comprising:
prior to receiving the position of the position reference device, receiving a list of approved position reference devices through the graphical user interface; and
determining that the position reference device is in the list of approved position reference devices before setting the position of the mobile device to the position of the position reference device.

15. The method of claim 1, wherein the mobile device comprises a graphical user interface, wherein the position reference device is a first position reference device, the method further comprising:
receiving a list of disapproved position reference devices through the graphical user interface;
receiving a position of a second position reference device; and
ignoring the position received from the second position reference device when the second position reference device is in the list of disapproved position reference devices.

16. The method of claim 1, wherein the mobile device comprises a graphical user interface, wherein the position reference device is a first position reference device, the method further comprising:
receiving a set of approved position reference device types through the graphical user interface;
receiving positioning assistance data from a second position reference device, the positioning assistance data received from the second position reference device comprising a type of the second position reference device and a position of the second position reference device; and
setting the position of the mobile device to the position of the second position reference device when the type of the second position reference device matches a type in the set of approved position reference device types.

17. The method of claim 16, wherein a position reference device type comprises at least one of a stationary type, a moving type, and an indication of a communication protocol supported by the position reference device and the associated transmission power level.

18. The method of claim 1, wherein the mobile device comprises a graphical user interface, the method further comprising:
receiving a command through the graphical user interface to disable positioning calibration;
disabling positioning calibration in response to the receiving of the command; and
ignoring any positioning assistance data received from position reference devices while positioning calibration is disabled.

19. The method of claim 1, wherein the mobile device comprises a graphical user interface, wherein the position reference device is a first position reference device, the method further comprising:
receiving a set of time intervals for positioning re-calibration through the graphical user interface;
receiving positioning assistance data from a second position reference device, the positioning assistance data received from the second position reference device comprising a position of the second position reference device; and
setting the position of the mobile device to the position of the second position reference device when a time the positioning assistance data is received from the second position reference device is within the set of time intervals for positioning re-calibration.

20. The method of claim 1, wherein the mobile device comprises a graphical user interface, wherein the position reference device is a first position reference device, the method further comprising:
receiving a set of regions for positioning re-calibration through the graphical user interface;
receiving a position a second position reference device from the second position reference device; and
setting the position of the mobile device to the position of the second position reference device only when the position of the second position reference device is within a region in the set of regions specified for positioning re-calibration.

21. The method of claim 1, wherein the mobile device comprises a graphical user interface, the method further comprising displaying the position of the mobile device on the graphical user interface.

\* \* \* \* \*